United States Patent
Nakase et al.

(10) Patent No.: US 8,810,229 B2
(45) Date of Patent: Aug. 19, 2014

(54) DC/DC CONVERTER

(75) Inventors: Yasunobu Nakase, Kanagawa (JP); Toru Goda, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 37 days.

(21) Appl. No.: 13/615,069

(22) Filed: Sep. 13, 2012

(65) Prior Publication Data
US 2013/0069613 A1 Mar. 21, 2013

(30) Foreign Application Priority Data

Sep. 21, 2011 (JP) ................. 2011-205708

(51) Int. Cl.
*H02M 3/156* (2006.01)
(52) U.S. Cl.
USPC .......................................... 323/285; 323/222
(58) Field of Classification Search
USPC .................. 323/222, 282–285, 351
See application file for complete search history.

(56) References Cited

U.S. PATENT DOCUMENTS

| | | | | |
|---|---|---|---|---|
| 5,923,154 A | * | 7/1999 | Moller | 323/222 |
| 8,193,797 B2 | * | 6/2012 | Zhang et al. | 323/283 |
| 8,384,367 B2 | * | 2/2013 | Murakami et al. | 323/285 |
| 8,541,991 B2 | * | 9/2013 | Lopata et al. | 323/224 |
| 2009/0322300 A1 | * | 12/2009 | Melanson et al. | 323/284 |

FOREIGN PATENT DOCUMENTS

| | | |
|---|---|---|
| JP | 2005-218166 A | 8/2005 |
| JP | 2005-218167 A | 8/2005 |

OTHER PUBLICATIONS

Hou-Ming Chen, et al., "A Monolithic Boost Converter with an Adaptable Current-Limited PFM Scheme", 2006 IEEE Asia Pacific Conference on Circuits and Systems (APCCAS), Dec. 2006, pp. 662-665.
Hou-Ming Chen, et al., "An Exact, High-Efficiency PFM DC-DC Boost Converter with Dynamic Stored Energy", Proceedings of the 15th IEEE International Conference on Electronics, Circuits and Systems (ICECS), Aug.-Sep. 2008, pp. 622-625.

* cited by examiner

*Primary Examiner* — Jessica Han
(74) *Attorney, Agent, or Firm* — Sughrue Mion, PLLC

(57) ABSTRACT

In a DC/DC converter, a control circuit determines an upper limit value of an inductor current based on a load current and an input dc voltage, and changes at least one of an on time and an off time of a switching element in such a manner that the detected inductor current does not exceed the upper limit value.

16 Claims, 15 Drawing Sheets

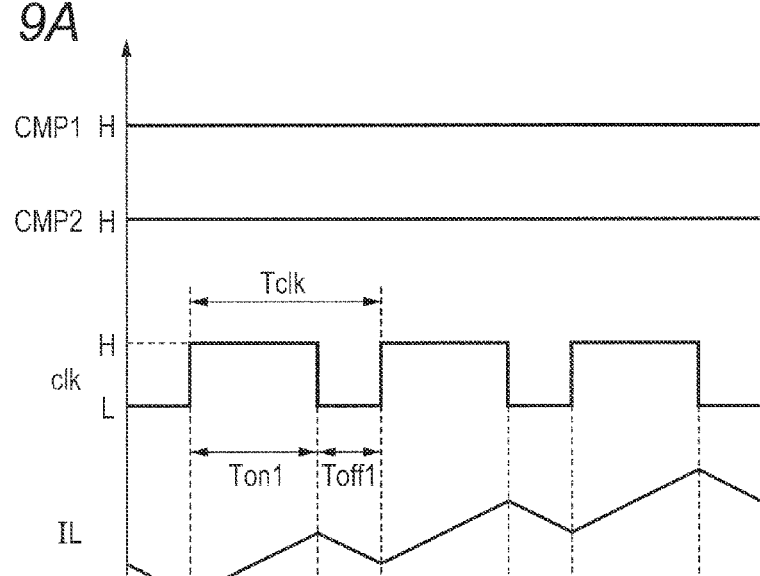
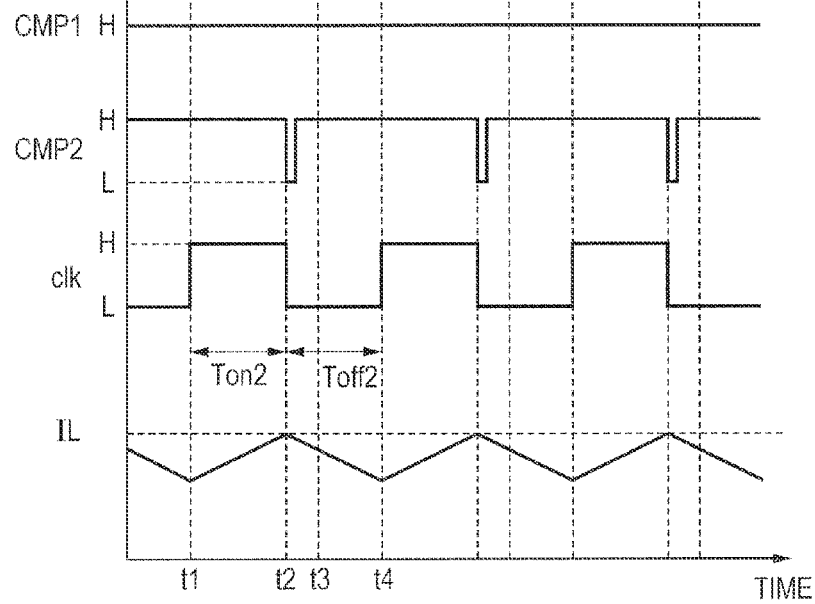

DC/DC CONVERTER

CROSS-REFERENCE TO RELATED APPLICATIONS

The disclosure of Japanese Patent Application No. 2011-205708 filed on Sep. 21, 2011 including the specification, drawings and abstract is incorporated herein by reference in its entirety.

BACKGROUND

The present invention relates to a switching type DC/DC converter which converts a dc voltage to another dc voltage.

Of control systems each used for a switching type DC/DC converter, feedback type PWM (Pulse Width Modulation) control has been used most commonly. A ratio between on and off times of a switching element can automatically be determined according to the value of an input voltage by making good use of a feedback function. An output voltage can hence be made accurately coincident with an expected value.

However, since it is necessary for feedback control to use an amplifier high in gain, this offers a possibility of oscillations. Since oscillation conditions change depending on an output load current, an output load capacity and the like, it is necessary to carefully add an oscillation prevention circuit according to the conditions of use. This is very hard for users unaccustomed to the prevention of oscillations to use.

As another problem, there is a point that since the output voltage is set by feedback, it takes time until the ratio between the on time and the off time reaches the optimum value. It therefore takes time to reach a stable state when the input voltage and the output voltage vary.

PFM (Pulse Frequency Modulation) control based on a feed forward system with no feedback has also been in widespread use to improve sensitivity. In a DC/DC converter described in, for example, Japanese Unexamined Patent Publication No. 2005-218166, a switching element is not driven during a period in which an output voltage exceeds a predetermined target voltage. When the output voltage becomes lower than the target voltage, the switching element is brought to an on state. Energy is stored in an inductor while the switching element is in the on state. When the current flowing through the inductor exceeds an upper limit value with time, the switching element is brought to an off state for a prescribed time.

A problem of the feed forward system resides in that in the case of a light load, a ripple voltage becomes large and power conversion efficiency is hence degraded. In order to cope with this problem, the DC/DC converter described in Japanese Unexamined Patent Publication No. 2005-218166 changes the upper limit value of the inductor current in reverse proportion to the switching period of the switching element.

A technology that changes an upper limit value of an inductor current with the same aim as Japanese Unexamined Patent Publication No. 2005-218166 has been disclosed even in other documents. In a DC/DC converter described in, for example, Japanese Unexamined Patent Publication No. 2005-218167, an upper limit value of an inductor current is made high when the number of load systems is increased, whereas the upper limit value of the inductor current is made low when the number of the load systems is decreased. In DC/DC converters disclosed by H. M. Chen, et al., an upper limit value of an inductor current is changed according to a variation in output voltage (refer to H. M. Chen, D. D. Jiang and R. C. Chang, "A Monolithic Boost Converter with an Adaptable Current-Limited PFM Scheme", 2006 IEEE Asia Pacific Conference on Circuits and Systems (APCCAS), December 2006, pp. 662-665 and H. M. Chen, R. C. Chang and P. S. Lei, "An Exact, High-Efficiency PFM DC-DC Boost Converter with Dynamic Stored Energy", Proceedings of the 15th IEEE International Conference on Electronics, Circuits and Systems (ICECS), August-September 2008, pp. 622-625).

SUMMARY

In each of the above related arts, the upper limit value of the inductor current is adjusted according to the switching frequency, the number of the load systems or the variation in the output voltage to thereby prevent power conversion efficiency from being degraded. It is, however, hard to say that the power conversion efficiency has sufficiently been improved even by these related arts. The inventors of the present application have studied the configuration of a control circuit capable of improving power conversion efficiency more than in the related arts, thereby leading to the completion of this invention.

An object of the present invention is to improve power conversion efficiency more than in the related art in a DC/DC converter of a feed forward control system.

A DC/DC converter according to one embodiment of the present invention is equipped with a converter circuit, an inductor current detector, a load current detector and a control circuit. The converter circuit includes an inductor and a switching element coupled to the inductor, and changes an inductor current flowing through the inductor according to on/off of the switching element to thereby convert an input dc voltage into an output dc voltage having a magnitude corresponding to each of an on time and an off time of the switching element and supplies the converted output dc voltage to a load. The inductor current detector detects the inductor current when the switching element is in an on state. The load current detector detects a load current flowing through the load from the converter circuit. The control circuit determines an upper limit value of the inductor current, based on the load current and the input dc voltage and changes at least one of the on and off times of the switching element in such a manner that the detected inductor current does not exceed the upper limit value.

According to the above embodiment, since the inductor current is controlled so as not to exceed the upper limit value determined based on the load current and the input dc voltage, power conversion efficiency can be improved more than in the related art.

BRIEF DESCRIPTION OF THE DRAWINGS

FIGS. 9A and 9B are timing diagrams for describing the operation of the DC/DC converter 1 equipped with the pulse generator 30 having the configuration shown in FIG. 8;

DETAILED DESCRIPTION

Figure 1:
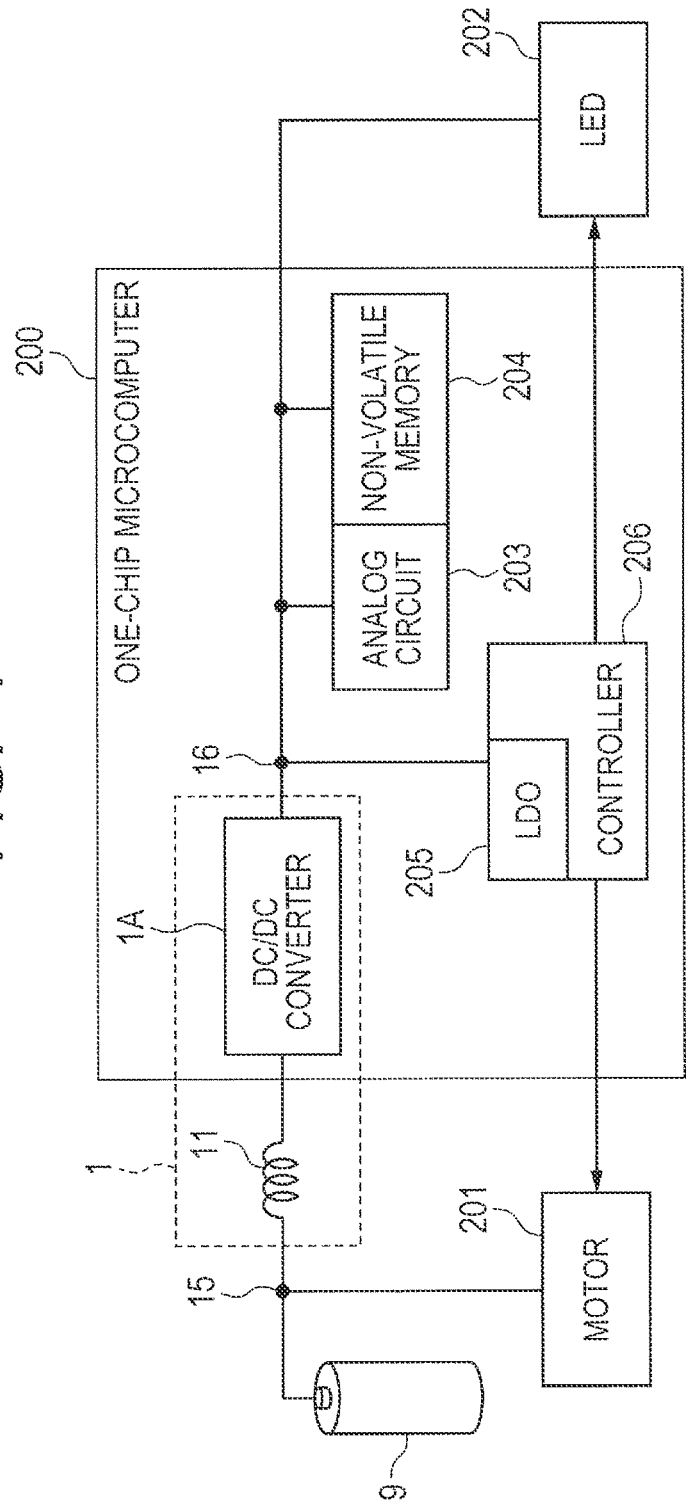
FIG. 1 is a block diagram showing an overall configuration of a system to which a DC/DC converter 1 of the present invention is applied.

Preferred embodiments of the present invention will hereinafter be described in detail with reference to the accompanying drawings. Incidentally, the same or corresponding parts are assigned the same reference numerals, and their description will be repeated.

First Embodiment

[Overall Configuration of System]

FIG. 1 is block diagram showing an overall configuration of a system to which a DC/DC converter 1 of the present invention is applied.

Battery-driven products such as an electric shaver, an electric toothbrush, an MP3 (MPEG Audio Layer-3) player, etc. have recently been increasing. Such portable devices are required to be light and small. It is thus desirable that they can be driven with one battery. A configuration example of such a battery-driven system is shown in FIG. 1.

The system shown in FIG. 1 includes a battery 9, a motor 201 and a light emitting diode (LED) 202 both driven with the battery 9, and a microcomputer chip (semiconductor device) 200. When the battery 9 is of a dry battery, the nominal output voltage of the battery 9 is 1.5V. When the battery 9 is of a nickel-metal hydride secondary battery, its nominal output voltage is 1.2V.

The microcomputer chip 200 is equipped with a controller 206 for controlling the motor 201 and the LED 202, a non-volatile memory 204 and an analog circuit 203, etc. Since a 3-V power supply is required to drive the non-volatile memory 204 and the analog circuit 203, the microcomputer chip 200 is further provided with the DC/DC converter 1 for stepping up a battery voltage to 3V.

The DC/DC converter 1 includes an external inductor 11, and a circuit portion 1A incorporated in the microcomputer chip 200. An output voltage of the DC/DC converter 1 is stabilized by an LDO (Low Drop-Out) regulator 205 and supplied to a controller 206. The motor 201 is coupled to an input node 15 of the DC/DC converter 1, and the LED 202 is coupled to an output node 16 of the DC/DC converter 1.

Since a large current flows when the motor 201 is driven, the output voltage of the battery 9 drops steeply. When the LED 202 is driven, an output load current of the DC/DC converter 1 increases greatly so that the output voltage is steeply lowered. The DC/DC converter 1 is provided with a mechanism for holding the output voltage constant with respect to such a change in input/output condition.

[Configuration of DC/DC Converter 1]

Figure 2:
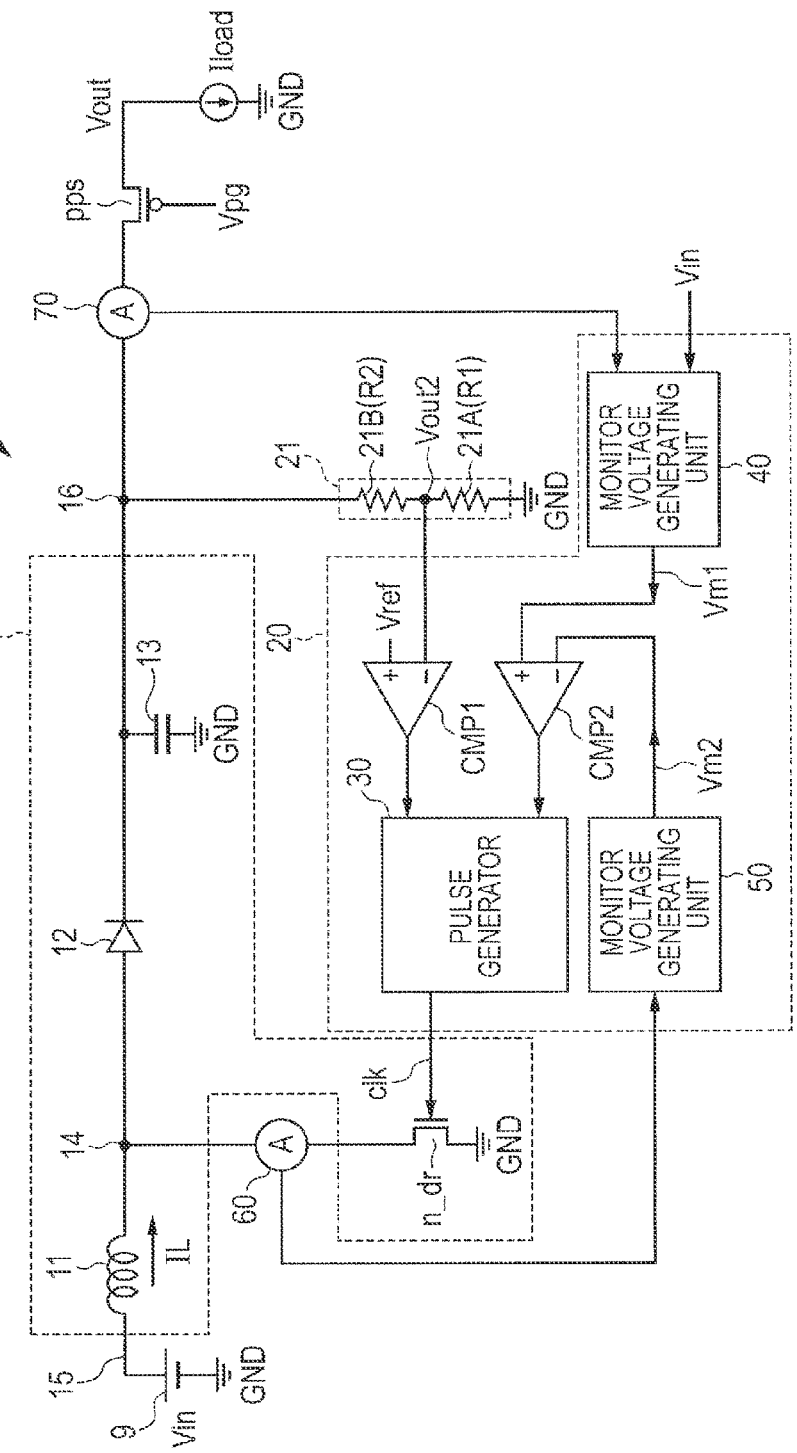
FIG. 2 is a circuit diagram illustrating a configuration of a DC/DC converter 1 according to a first embodiment of the present invention.

FIG. 2 is a circuit diagram showing a configuration of a DC/DC converter 1 according to a first embodiment of the present invention. The DC/DC converter 1 is a step-up converter which steps up a dc voltage Vin (e.g., 1V to 2V) inputted to an input node 15 and outputs the thus stepped-up voltage Vout (e.g., 3V) from an output node 16.

As shown in FIG. 2, the DC/DC converter 1 includes a converter circuit (step-up chopper) 10, a control circuit 20, a voltage divider 21 which divides the voltage Vout of the output node 16 by resistive elements 21A and 21B, an inductor current detecting unit 60 which detects an inductor current IL that flows through an inductor 11, and a load current detecting unit 70 which detects a load current Iload. A dc power supply 9 such as a battery is coupled to the input node 15. The output node 16 is coupled to a load (load current Iload) through a PMOS (Positive-channel Metal Oxide Semiconductor) transistor pps used as a power switch. A power supply voltage for driving the control circuit 20 is supplied from the output node 16 (hereinafter also called "power supply node VDD").

[Configuration and Operation of Converter Circuit 10]

The converter circuit 10 includes the inductor 11, a diode 12, an NMOS (Negative-channel Metal Oxide Semiconductor) transistor n_dr used as a switching element, and a capacitor 13. The inductor 11 and the diode 12 are coupled in series between the input node 15 and the output node 16 in this order. The NMOS transistor n_dr is provided between a coupling node 14 of the inductor 11 and the diode 12 and a ground node GND. A clock signal (also called a control signal) clk is inputted from the control circuit 20 to a gate of the NMOS transistor n_dr. The NMOS transistor n_dr is switched to on and off states according to the logic level of the clock signal clk. The capacitor 13 is coupled between the output node 16 and the ground node GND.

In order to make the output voltage Vout higher than the input voltage Vin, the current of the inductor 11 is supplied to the output node 16, while there is a need to prevent backflow of current from the output node 16 to the inductor 11. As rectification systems thereof, there are two types of diode rectification and synchronous rectification. A configuration example of the diode rectification system is shown in FIG. 1. The diode 12 is so coupled that the direction of the current from the coupling node 14 to the output nod 16 assumes a forward direction. The current is therefore prevented from flowing backward.

Figure 3:
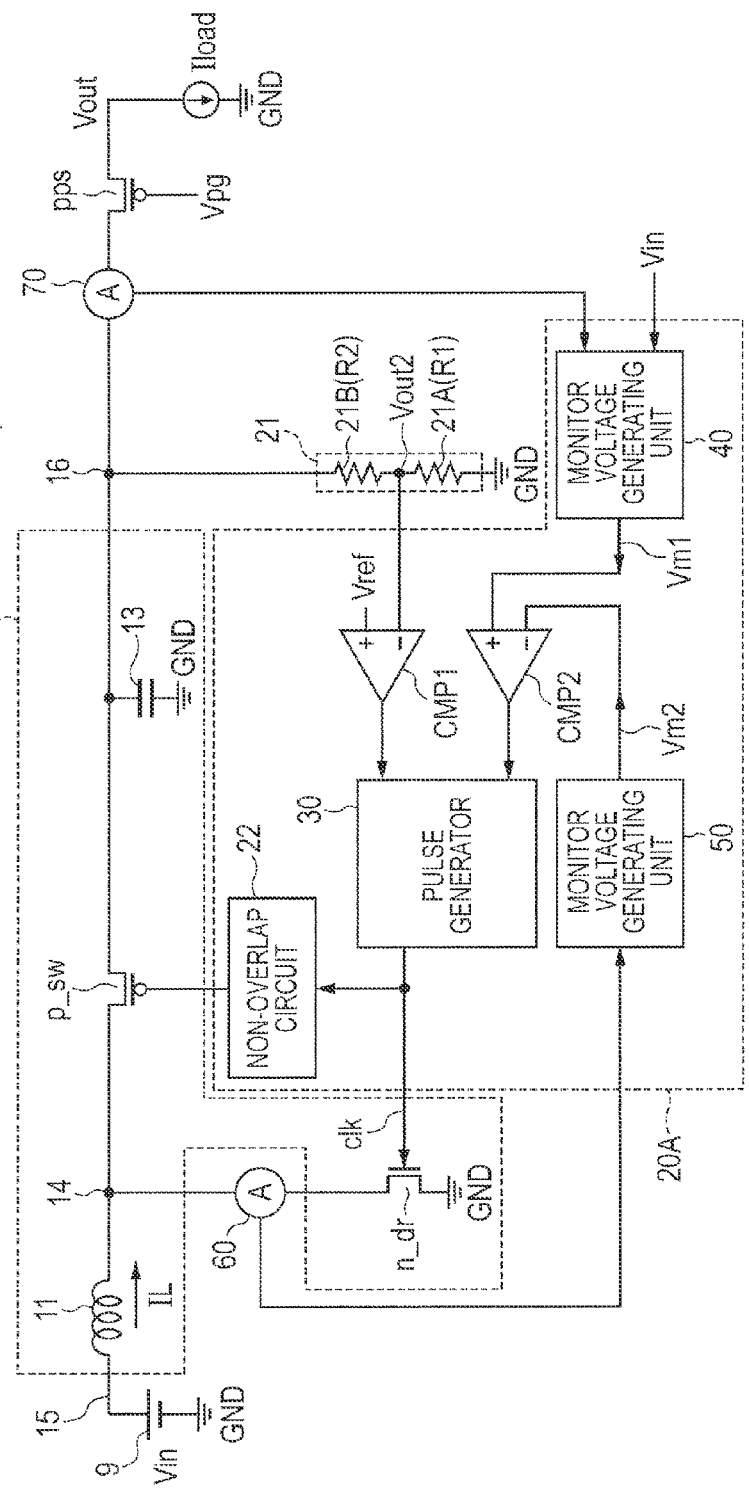
FIG. 3 is a circuit diagram depicting a configuration of a synchronous rectification type DC/DC converter 2 as a modification of FIG. 2.

FIG. 3 is a circuit diagram showing a configuration of a DC/DC converter 2 based on the synchronous rectification system as a modification of FIG. 2. In the DC/DC converter 2 shown in FIG. 3, a PMOS transistor p_sw for synchronous rectification is provided instead of the diode 12 of FIG. 1. Using the synchronous rectification enables a further reduction in loss.

The step-up operations of the DC/DC converters are represented as follows: When the clock signal clk is high in level (H level), the NMOS transistor n_dr is turned on to store current in the inductor 11. When the diode rectification system of FIG. 2 is taken, the stored current is supplied to the output node 16 through the diode 12 during an off period in which the next clock signal clk becomes low in level (L level). The NMOS transistor n_dr is repeatedly turned on and off so that a voltage obtained by stepping up the input dc voltage Vin is supplied to the load.

In the synchronous rectification system of FIG. 3, the PMOS transistor p_sw is turned on during an off period of the NMOS transistor n_dr. If there is an overlap period in which the PMOS transistor p_sw is tuned on, before the NMOS transistor n_dr is turned off, a large through current flows. Thus, the on period of the NMOS transistor n_dr and the on period of the PMOS transistor p_sw are controlled by a non-overlap circuit 22 so as not to overlap each other.

Figure 4:
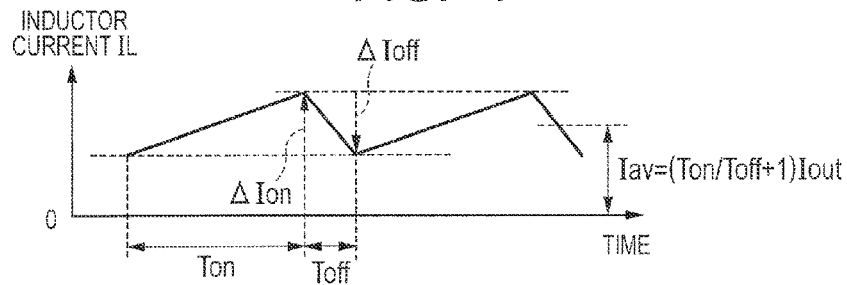
FIG. 4 is a waveform diagram of an inductor current IL that flows through an inductor 11 shown in each of FIGS. 2 and 3.

FIG. 4 is a waveform diagram of the inductor current IL that flows through the inductor 11 shown in each of FIGS. 2 and 3. If the on time is assumed to be Ton, the off time is assumed to be Toff, and the inductance of the inductor 11 is assumed to be L with reference to FIGS. 2, 3 and 4, an increase ΔIon in the current flowing through the inductor 11 during a period in which the NMOS transistor n_dr is on, is expressed in $\Delta Ion=Vin \cdot Ton/L$ . . . (1). A decrease ΔIoff in the current flowing through the inductor 11 during a period in which the NMOS transistor n_dr is off is expressed in $\Delta Ioff=(Vout-Vin) \cdot Toff/L$ . . . (2). In the above equations (1) and (2), however, a forward voltage drop of the synchronous element (diode 12 or PMOS transistor p_sw) and a voltage drop developed due to a parasitic resistance thereof are neglected. In a steady state, the inductor current ΔIon having increased during the on period is canceled by the decrease ΔIoff during the off period. That is, since ΔIon=ΔIoff, the ratio between the on time and the off time (hereinafter referred to as "Ton/Toff ratio") is stabilized by a ratio of $Ton/Toff=Vout/Vin-1$ . . . (3). An average value Iav of the inductor current IL is given by $Iav=(Ton/Toff+1) \cdot Iout$ . . . (4) using an average output current Tout.

[Method of Determining Upper Limit Value ILMax of Inductor Current IL]

A method of determining the upper limit value ILmax of the inductor current IL, which is a feature of the present invention, will be explained next.

Figure 5:
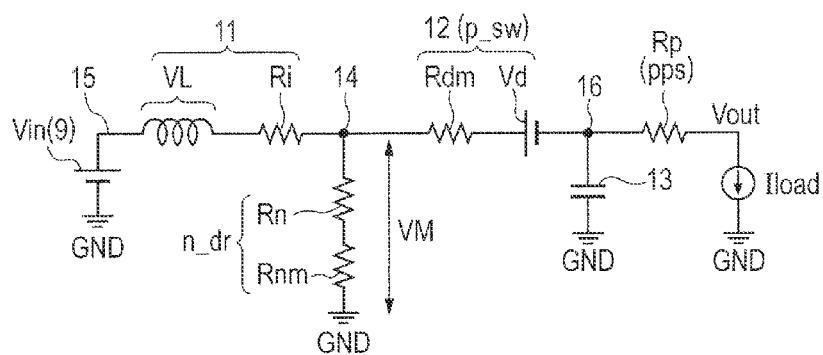
FIG. 5 is an equivalent circuit diagram for analyzing the operation of a converter circuit 10 shown in each of FIGS. 2 and 3.

FIG. 5 is an equivalent circuit diagram for analyzing in further detail, the operation of the converter circuit 10 shown in each of FIGS. 2 and 3. Referring to FIG. 5, the on resistance of the NMOS transistor n_dr shown in each of FIGS. 2 and 3 is assumed to be Rn, and its parasitic resistance is assumed to be Rnm. The parasitic resistance of the inductor 11 is assumed to be Ri, and a difference in potential developed across the inductor 11 is assumed to be VL. The parasitic resistance of the synchronous element (diode 12 or PMOS transistor p_sw) is assumed to be Rdm, and its forward drop voltage is assumed to be Vd. The on resistance of the PMOS transistor pps is assumed to be Rp. Assuming that a substantial output voltage (voltage of node 14) is VM, an effective Ton/Toff ratio (described as $(Ton/Toff)_{eff}$) is defined by $(Ton/Toff)_{eff}=VM/VL-1$ . . . (5).

As shown in FIG. 4, the inductor current IL that flows through the inductor 11 gradually increases when the NMOS transistor n_dr is in an on state, and reaches the maximum value ILmax at the instant when the NMOS transistor n_dr is changed from the on to off state. The difference in potential VL developed across the inductor 11 at this time is given by $VL=Vin-ILmax \cdot (Ri+Rn+Rnm)$ . . . (6), and the output voltage VM is given by $VM=Vout+Vd+ILmax \cdot (Rdm+Rp)$ . . . (7). The power conversion efficiency η is expressed $\eta=(Vout/Vin)/(VM/VL)=(Vout/Vin)/[(Ton/Toff)_{eff}+1]$ . . . (8).

It is understood from the above equations (6) through (8) that the power conversion efficiency η is improved if the ILmax is set low. However, if the ILmax is set too low, a load current Iload cannot be supplied. An optimal value is provided for the ILmax. The optimal value is given when the ILmax, input power Vin, load current Iload and output voltage Vout satisfy a relationship of $ILmax \cdot Vin=Iload \cdot Vout$ . . . (9). Since η=1 in this case, the ILmax is expressed in $ILmax=Iload \cdot (Vout/Vin)=Iload \cdot [Ton/Toff]_{eff}+1]=Iload \cdot VM/VL$ . . . (10) from the above equations (8) and (9). Substituting the equations (6) and (7) into the equation (10) yields approximately $ILmax=Iload \cdot (Vout+Vd)/Vin \propto Ioad/Vin$ . . . (11).

Since the forward drop voltage Vd and the output voltage Vout may be considered to be fixed values respectively as shown in the equation (11), the ILmax may be set to be proportional to Iload/Vin in order to improve the power conversion efficiency η. Thus, the control circuits 20 and 20A shown in FIGS. 2 and 3 respectively determine the upper limit value (i.e., ILmax) of the inductor current IL in such a manner that it is proportional to the value of Iload/Vin.

[Configuration and Operation of Control Circuit 20]

As described above, the control circuit 20 of FIG. 2 determines the upper limit value of the inductor current IL in such a manner that it is proportional to the value of Iload/Vin, based on the load current Iload detected by the load current detecting unit 70 and the input dc voltage Vin. Then, the control circuit 20 changes at least one of the on and off times of the NMOS transistor n_dr in such a manner that the inductor current IL detected by the inductor current detecting unit 60 does not exceed the above upper limit value. It is thus possible to improve the power conversion efficiency η more than in the related art.

The configuration and operation of the control circuit 20 will hereafter be explained in further detail. Incidentally, since the control circuit 20A of FIG. 3 is identical to the control circuit 20 except that it further includes the non-overlap circuit 22, the control circuit 20 will hereinafter be described as typical.

(Schematic Configuration of Control Circuit 20)

The schematic configuration of the control circuit 20 will first be explained with reference to FIG. 2. The control circuit 20 includes first and second monitor voltage generating units 40 and 50, comparators CMP1 and CMP2, and a pulse generator (control signal generating unit) 30.

The monitor voltage generating unit 40 generates a monitor voltage Vm1 corresponding to the above upper limit value, based on the load current Iload detected by the load current detecting unit 70 and the input dc voltage Vin. The monitor voltage generating unit 50 generates a monitor voltage Vm2, based on the inductor current IL detected by the inductor current detecting unit 60.

The comparator CMP1 compares an output voltage Vout2 (also called divided voltage Vout2) of the voltage divider 21 and a reference voltage Vref. Assuming that the resistance values of the resistive elements 21A and 21B that configure the voltage divider 21 are R1 and R2 respectively, the divided voltage Vout2 is given by Vout2=Vout×R1/(R1+R2) . . . (12). The comparator CMP1 outputs a signal brought to an L level when the divided voltage Vout2 exceeds the reference voltage Vref.

The comparator CMP2 compares the monitor voltage Vm1 and the monitor voltage Vm2. When the monitor voltage Vm2 exceeds the monitor voltage Vm1, the comparator CMP2 outputs a signal brought to an L level.

The pulse generator 30 generates a clock clk for driving the gate of the NMOS transistor n_dr. When at least one of the output signals of the comparators CMP1 and CMP2 is of the L level, the pulse generator 30 fixes the logic level of the clock signal clk to an L level to thereby bring the NMOS transistor n_dr to an off state. The respective components will be described below in detail.

(Configurations and Operations of Monitor Voltage Generating Units 40 and 50)

Figure 6:
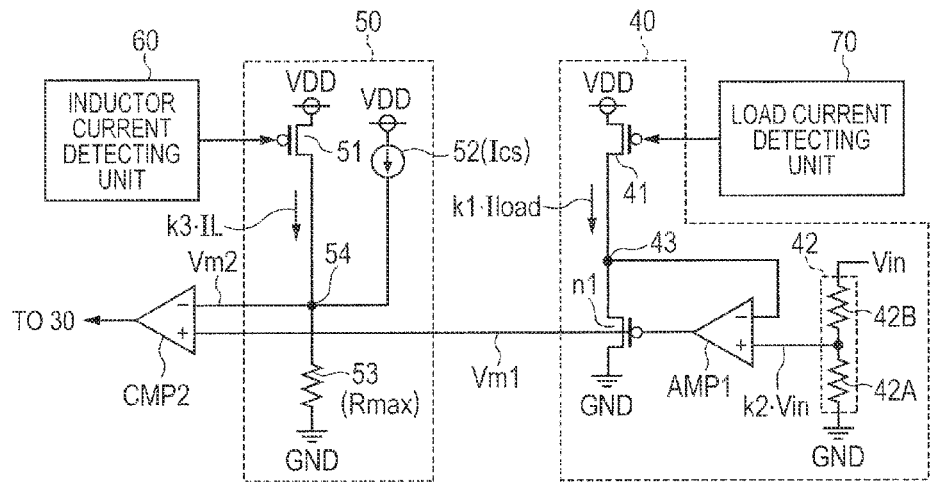
FIG. 6 is a circuit diagram showing concrete configurations of first and second monitor voltage generating units 40 and 50 shown in FIG. 2.

FIG. 6 is a circuit diagram showing concrete configurations of the first and second monitor voltage generating units 40 and 50 shown in FIG. 2.

Referring to FIG. 6, the first monitor voltage generating unit 40 includes a PMOS transistor 41, an NMOS transistor n1, a voltage divider 42 which divides an input dc voltage Vin by the resistive elements 42A and 42B, and a differential amplifier AMP1.

The PMOS transistor 41 and the NMOS transistor n1 are coupled in series between a power supply node VDD and a ground node GND in this order. The PMOS transistor 41 configures a current mirror with a PMOS transistor provided in the load current detecting unit 70. Thus, a current k1·Iload proportional to the load current Iload flows through the PMOS transistor 41.

The differential amplifier AMP1 amplifies a difference voltage between a voltage k2·Vin (where k2: division ratio) obtained by dividing the input dc voltage Vin by the voltage divider 42, and a voltage applied between the drain and source of the NMOS transistor n1. The output voltage of the differential amplifier AMP1 is inputted to a gate of the NMOS transistor n1 and inputted to a non-inversion input terminal of the comparator CMP2 as a monitor voltage Vm1. Specifically as shown in FIG. 6, the non-inversion input terminal of the differential amplifier AMP1 is coupled to a coupling node of the resistive elements 42A and 42B that configure the voltage divider 42. An inversion input terminal of the differential amplifier AMP1 is coupled to a coupling node 43 of the transistors 41 and n1. An output terminal of the differential amplifier AMP1 is coupled to the gate of the NMOS transistor n1 and coupled to the non-inversion input terminal of the comparator CMP2.

The division ratio k2 of the voltage divider 42 is set in such a manner that the NMOS transistor n1 is operated in a linear region (also called an unsaturated region or ohmic region). In this case, the on resistance Ron (n1) of the NMOS transistor n1 is given by Ron (n1)=1/[β·(VG−Vth)]=Vin/[k·Iload] (13) using a gate voltage VG of the NMOS transistor n1 and a threshold voltage Vth thereof. In the equation (13), β indicates transconductance, and k is equal to k1/k2. From the equation (13), the gate voltage VG is expressed in VG=k·Iload/(β·Vin)+Vth . . . (14). The gate voltage VG given by the above equation (14) is equivalent to the monitor voltage Vm1 and inputted to the non-inversion input terminal of the comparator CMP2.

The second monitor voltage generating unit 50 includes a PMOS transistor 51, a resistive element 53 (whose resistance value: Rmax), and a constant current source 52. The PMOS transistor 51 and the resistive element 53 are coupled between the power supply node VDD and the ground node GND in this order. The PMOS transistor 51 configures a current mirror together with a PMOS transistor provided in the inductor current detecting unit 60. Thus, a current k3·IL proportional to the inductor current IL flows through the PMOS transistor 51 (where k3 is a predetermined proportionality constant, e.g., k3=1/1000).

The constant current source 52 injects a predetermined constant current Ics to a coupling node 54 of the PMOS transistor 51 and the resistive element 53. Thus, since a current obtained by adding the current k3·IL and the constant current Ics flows through the resistive element 53, the voltage (difference in voltage developed across the resistive element 53) Vm2 of the coupling node 54 is proportional to the thus-added current and expressed in Vm2=(k3·IL+Ics)·Rmax . . . (15). The voltage of the coupling node 54 is inputted to the inversion input terminal of the comparator CMP2 as the monitor voltage Vm2.

Since the voltage VG (=Vm1) of the equation (14) and the voltage Vm2 of the equation (15) are compared by the comparator CMP2, the upper limit value ILmax of the inductor current IL can be defined as ILmax∝Iload/Vin . . . (17) if Ics is set to be Ics·Rmax=Vth . . . (16).

(Configurations and Operations of Inductor Current Detecting Unit 60 and Load Current Detecting Unit 70)

Figure 7:
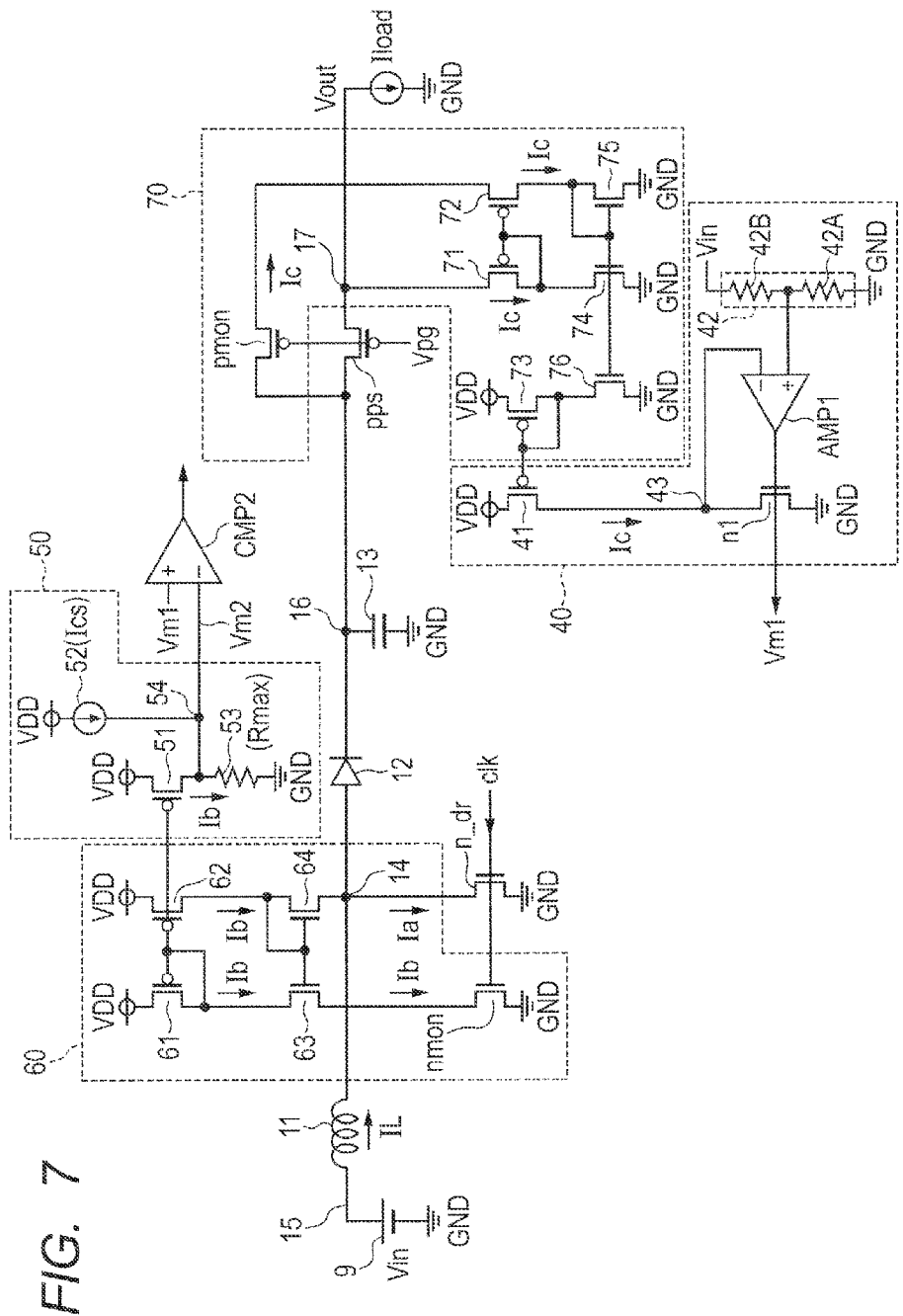
FIG. 7 is a circuit diagram illustrating configurations of an inductor current detecting unit 60 and a load current detecting unit 70 shown in FIG. 2.

FIG. 7 is a circuit diagram showing the configurations of the inductor current detecting unit 60 and the load current detecting unit 70 shown in FIG. 2. The configuration and operation of the inductor current detecting unit 60 will first be explained.

The inductor current detecting unit 60 includes PMOS transistors 61 and 62, and NMOS transistors 63, 64 and nmon. The PMOS transistor 61 and the NMOS transistors 63 and nmon are coupled in series between a power supply node VDD and a ground node GND in this order. The PMOS transistor 62 and the NMOS transistor 64 are coupled in series between the power supply node VDD and a coupling node 14 in this order.

A gate of the PMOS transistor 61 is coupled to its own drain and coupled to a gate of the PMOS transistor 62 and a gate of the PMOS transistor 51 that configures the monitor voltage generating unit 50. Thus, the PMOS transistors 61, 62 and 51 configure a current mirror, and currents Ib equal in magnitude flow through the transistors 61, 62 and 51. Further, a gate of the NMOS transistor 63 is coupled to a gate and drain of the NMOS transistor 64. Since the currents Ib equal in magnitude flow through the NMOS transistors 63 and 64, a source potential of the NMOS transistor 63 becomes equal to a source potential (potential of coupling node 14) of the NMOS transistor 64. That is, a drain voltage of the NMOS transistor n_dr and a drain voltage of the NMOS transistor nmon become equal to each other.

The NMOS transistor nmon is provided to monitor the inductor current IL. The clock signal clk common to the NMOS transistor n_dr is inputted to a gate of the NMOS transistor nmon. Further, since the drain voltage of the NMOS transistor n_dr and the drain voltage of the NMOS transistor nmon are equal to each other as mentioned above, a current Ia (equal to the inductor current IL when it is in its on state) flowing through the NMOS transistor n_dr, and a current Ib that flows through the NMOS transistor nmon respectively assume a magnitude proportional to each individual gate size W/L (ratio between a gate width W and a gate length L). When, for example, the gate size W/L of the monitoring NMOS transistor nmon is set to $\frac{1}{1000}$ of the gate size W/L of the NMOS transistor n_dr, Ib=Ia/1000=IL/1000.

Thus, the inductor current detecting unit 60 detects the current Ib (=IL/1000) proportional to the inductor current IL by means of the NMOS transistor nmon. The detected current Ib is copied by the current mirror and thereby flows through the resistive element 53 as a drain current of the PMOS transistor 51 that configures the monitor voltage generating unit 50.

The configuration and operation of the load current detecting unit 70 will next be explained. The load current detecting unit 70 includes PMOS transistors pmon and 71 through 73, and NMOS transistors 74 through 76. The PMOS transistors pmon and 72 and the NMOS transistor 75 are coupled in series between an output node 16 and the ground node GND in this order. The PMOS transistor 71 and the NMOS transistor 74 are coupled in series between a node 17 on the load side of the PMOS transistor pps and the ground node GND. The PMOS transistor 73 and the NMOS transistor 76 are coupled in series between the power supply node VDD and the ground node GND in this order.

A gate of the NMOS transistor 75 is coupled to its own drain and coupled to respective gates of the NMOS transistors 74 and 76. Thus, the NMOS transistors 75, 74 and 76 configure a current mirror, and currents Ic equal in magnitude flow through the respective transistors 75, 74 and 76. Further, a gate of the PMOS transistor 72 is coupled to a gate and drain of the PMOS transistor 71. Since the currents Ic equal in magnitude flow through the PMOS transistors 71 and 72 at this time, a source potential of the PMOS transistor 72 becomes equal to a source potential (potential of node 17) of the PMOS transistor 71. That is, a drain voltage of the PMOS transistor pps becomes equal to a drain voltage of the PMOS transistor pmon.

The PMOS transistor pmon is provided to monitor a load current Iload. A control voltage Vpg common to the PMOS transistor pps is applied to a gate of the PMOS transistor pmon. Further, as described above, the drain voltage of the PMOS transistor pps and the drain voltage of the PMOS transistor pmon are equal to each other, and sources of the PMOS transistors pps and pmon are coupled to the common output node 16. Thus, the ratio between the load current Iload flowing through the PMOS transistor pps and the current Ic flowing through the PMOS transistor pmon becomes a magnitude proportional to each gate size W/L (ratio between a gate width W and a gate length L). Assuming that, for example, the gate size W/L of the monitoring PMOS transistor pmon is set to $\frac{1}{1000}$ of the gate size W/L of the PMOS transistor pps, Ic=Iload/1000.

Thus, in the load current detecting unit 70, the current Ic proportional to the load current Iload is detected by the PMOS transistor pmon. The detected current Ic is copied by the current mirror as a drain current of the PMOS transistor 73. Since the gate of the PMOS transistor 41 that configures the monitor voltage generating unit 40 is coupled to a gate and drain of the PMOS transistor 73 herein, the PMOS transistors 73 and 41 configure a current mirror. Thus, the current IC (∝Iload) detected by the PMOS transistor pmon is finally copied as a drain current of then NMOS transistor n1 that configures the monitor voltage generating unit 40.

(Configuration and Operation of Pulse Generator 30)

Figure 8:
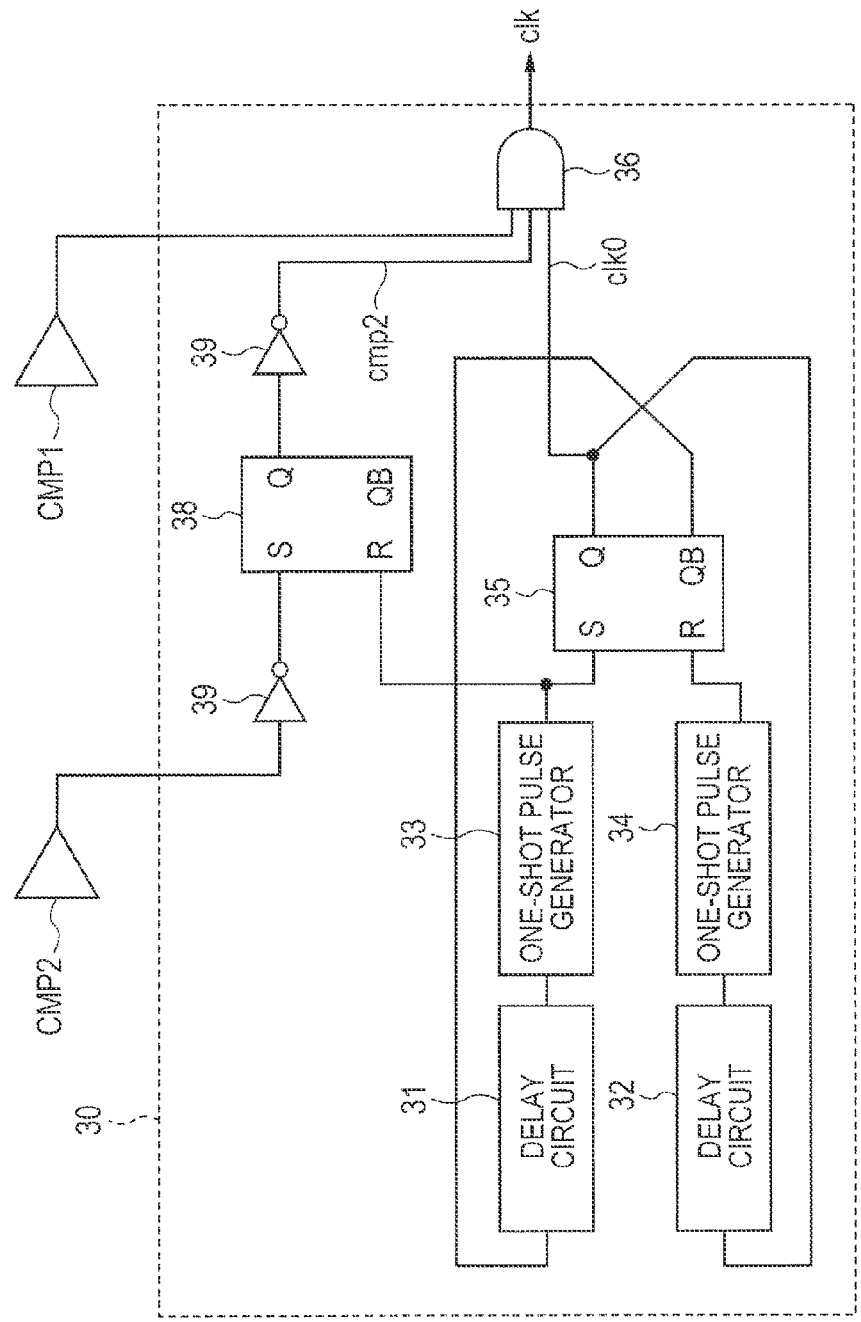
FIG. 8 is a block diagram depicting one example of a configuration of a pulse generator 30 shown in FIG. 2.

FIG. 8 is a block diagram showing one example of a configuration of the pulse generator 30 shown in FIG. 2. Referring to FIG. 8, the pulse generator 30 includes delay circuits 31 and 32, one-shot pulse generators 33 and 34, RS latch circuits 35 and 38, an AND gate 36, and inverters 37 and 39. Configuration examples of the one-shot pulse generators 33 and 34 will be explained later with reference to FIGS. 9A through 11.

In FIG. 8, a signal outputted from an inversion output terminal QB of the RS latch circuit 35 is delayed by the delay circuit 31, followed by being inputted to the on-shot pulse generator 33. When the input signal is changed from an L level to an H level, a pulse brought to an H level during a predetermined time (e.g., 10 ns) is generated from the one-shot pulse generator 33. The generated one-shot pulse is inputted to a set terminal S of the RS latch circuit 35 and inputted to a reset terminal R of the RS latch circuit 38.

A signal outputted from a non-inversion output terminal Q of the RS latch circuit 35 is delayed by the delay circuit 32, followed by being inputted to the one-shot pulse generator 34. When the input signal is switched from an L level to an H level, a pulse is generated from the one-shot pulse generator 34. The generated one-shot pulse is inputted to a reset terminal R of the RS latch circuit 35.

Owing to the above configuration, a clock signal clk0 having a predetermined period corresponding to each of delay times of the delay circuits 31 and 32 is outputted from the non-inversion output terminal Q of the RS latch circuit 35. The period during which the clock signal clk0 becomes an L level is equal to the delay time (corresponding to an off period of the NMOS transistor n_dr). The period during which the clock signal clk0 becomes an H level is equal to the delay time (corresponding to an on time of the NMOS transistor n_dr) of the delay circuit 32.

An output signal of a comparator CMP2 is inputted to a set terminal S of the RS latch circuit 38 through the inverter 37. The AND gate 36 receives an output signal of a comparator CMP1, a signal cmp2 outputted via the inverter 39 from a non-inversion output terminal Q of the RS latch circuit 38, and the clock signal clk0 outputted from the non-inversion output terminal Q of the RS latch circuit 35. When the output signal of the comparator CMP1 and the signal cmp2 are both H in level, the clock signal clk0 outputted from the non-inversion output terminal Q of the RS latch circuit 35 is outputted from the AND gate 36 as a clock signal clk and inputted to its corresponding gate of the NMOS transistor n_dr. The NMOS transistor n_dr repeats on and off according to the clock signal clk. When the output signal of the comparator CMP1 or the signal cmp2 becomes L in level, the clock signal clk outputted from the AND gate 36 is fixed to the L level. As a result, the NMOS transistor n_dr is brought to an off state.

FIGS. 9A and 9B are timing diagrams for describing the operation of the DC/DC converter 1 equipped with the pulse generator 30 having the configuration shown in FIG. 8. Waveforms shown in FIGS. 9A and 9B respectively show the output signals of the comparators CMP1 and CMP2, the clock signal clk and the inductor current IL in FIG. 2 in order from above. FIG. 9A shows the case where the respective output signals of the comparators CMP1 and CMP2 of FIG. 2 are of the H level. FIG. 9B shows the case where the output signal of the comparator CMP2 is temporarily brought to the L level because Iload/Vin has reached an upper limit value.

Referring to FIG. 9A, the clock signal clk is changed to the H level at a time t1 so that the NMOS transistor n_dr of FIG. 2 is switched to an on state. As a result, the inductor current IL gradually increases after the time t1.

Since the RS latch circuit 35 is brought to a reset state at a time t3 at which the delay time of the delay circuit 32 of FIG.

8 has elapsed from the time t1, the clock signal clk is switched to the L level. Thus, since the NMOS transistor n_dr is brought to the off state, the inductor current IL gradually decreases after the time t3.

Since the RS latch circuit 35 is brought to a set state at a time t4 at which the delay time of the delay circuit 31 of FIG. 8 has elapsed from the time t3, the clock signal clk is switched to the H level. Thus, since the NMOS transistor n_dr is brought to the on state, the inductor current IL gradually increases after the time t4. The above process is repeated below in a similar manner.

The period from the times t1 through t3 is equivalent to the on time Ton1 of the NMOS transistor n_dr. The period from the times t3 to t4 is equivalent to the off time Toff1 of the NMOS transistor n_dr. The sum of the on time Ton1 and the off time Toff1 becomes a period Tclk for the clock signal clk.

Next, referring to FIG. 9B, the clock signal clk is switched to the H level at the time t1 as with the case of FIG. 9A so that the NMOS transistor n_dr is changed to the on state. As a result, the inductor current IL gradually increases after the time t1.

At the next time t2, prior to the time t3 at which the delay time of the delay circuit 32 of FIG. 8 elapses, the output signal of the comparator CMP2 is switched to the L level due to Iload/Vin exceeding the upper limit value. Consequently, the RS latch circuit 38 is brought to a set state so that the signal cmp2 is switched to an L level. Thus, since the clock signal clk is switched to the L level, the NMOS transistor n_dr is brought to the off state. As a result, the inductor current IL gradually decreases after the time t2.

At the next time t3, the RS latch circuit 35 is brought to the reset state with the elapse of the delay time of the delay circuit 32 shown in FIG. 8, so that the output signal clk0 of the RS latch circuit reaches an L level. The clock signal clk remains unchanged because it has already reached the L level since the time t2.

At the next time t4, the RS latch circuit 35 is brought to the set state with the elapse of the delay time of the delay circuit 31 shown in FIG. 8, so that the output signal clk0 of the RS latch circuit 35 is switched to an H level. At this time, the output of the comparator CMP2 has already been returned to the H level, and hence the RS latch circuit 38 assumes the reset state. Thus, the signal cmp2 is switched to the H level, and the clock signal clk is switched to the H level.

When a comparison is made between FIGS. 9A and 9B, the on time Ton2 (between the times t1 and t2) of FIG. 9B is shorter than the on time Ton1 (between the times t1 and t3) of FIG. 9A. On the other hand, the Toff2 (between the times t2 and t4) of FIG. 9B is longer than the off time Toff1 (between the times t3 and t4) of FIG. 9A. Thus, in the case of FIG. 9B in which Iload/Vin has reached the upper limit value, the on time is reduced and the off time is increased as compared with FIG. 9A, so that an increase in the inductor current IL is suppressed, thus making it possible to reduce needless consumption power.

As to the period for the clock signal clk, the period for the clock signal clk in FIG. 9B is equal to the period Tclk for the clock signal clk in FIG. 9A. Thus, in the DC/DC converter 1 equipped with the pulse generator 30 of FIG. 8, PWM control of a feed forward system is realized in which a duty ratio Ton/(Ton+Toff) changes according to the magnitude of Iload/Vin.

(One Example of Configuration of One-Shot Pulse Generators 33 and 34)

Figure 10:
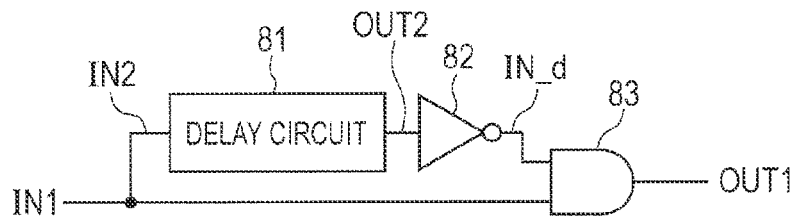
FIG. 10 is a circuit diagram illustrating one example of a configuration of one-shot pulse generators 33 and 34 shown in FIG. 8.

FIG. 10 is a circuit diagram showing one example of a configuration of the one-shot pulse generators 33 and 34 shown in FIG. 8. Referring to FIG. 10, each of the one-shot pulse generators 33 and 34 includes a delay circuit 81, an inverter 83 and an AND gate 83. A signal from an input node IN1 is inputted to a first input terminal of the AND gate 83 and passes through the delay circuit 81 and the inverter 82 in order, followed by being inputted to a second input terminal of the AND gate 83.

Figure 11:
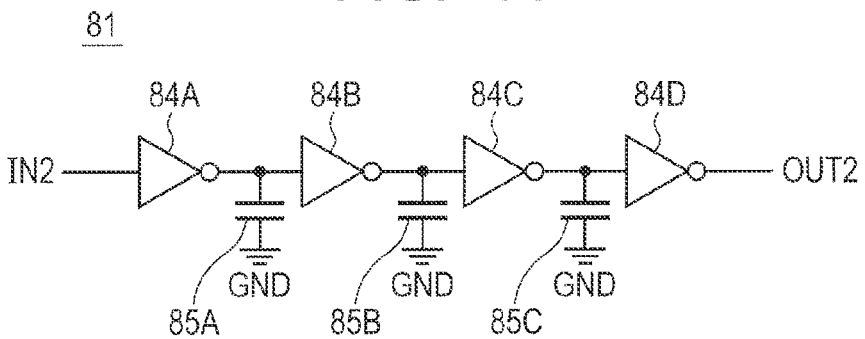
FIG. 11 is circuit diagram depicting one example of a configuration of a delay circuit 81 shown in FIG. 10.

FIG. 11 is a circuit diagram showing one example of a configuration of the delay circuit 81 shown in FIG. 10. Referring to FIG. 11, the delay circuit 81 includes inverters 84A, 84B, 84C and 84D coupled in series between an input node IN2 and an output node OUT2, and capacitors 85A, 85B and 85C coupled between coupling nodes of these inverters and a ground node GND.

Figure 12:
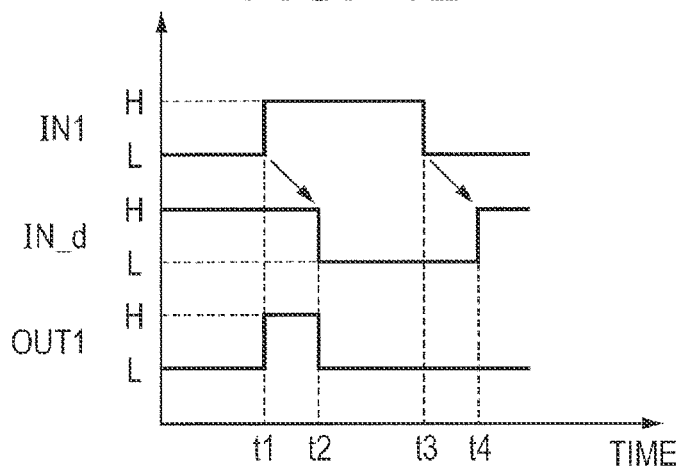
FIG. 12 is a timing diagram showing voltage waveforms of respective parts in FIG. 10.

FIG. 12 is a timing diagram showing voltage waveforms of the respective parts shown in FIG. 10. The timing diagram of FIG. 12 shows a voltage waveform of the input node IN1 of the one-shot pulse generator, a voltage waveform of an output node IN_d of the inverter 82, and a voltage waveform of an output node OUT1 of the one-shot pulse generator in order from above.

As shown in FIG. 12, the voltage of the output node IN_d of the inverter 82 falls at a time t2 delayed by a delay time of the delay circuit 81 than the rise time t1 of the voltage of the input node IN1. The voltage of the output node IN_d of the inverter 82 rises at a time t4 delayed by the delay time of the delay circuit 81 than the fall time t3 of the voltage of the input node IN1. As a result, a pulse brought to an H level is generated at the output node OUT1 of the one-shot pulse generator between the times t1 and t2. Thus, the pulse width of the pulse generated by each of the one-shot pulse generators 33 and 34 can be determined by the delay value of the delay circuit 81.

[Advantageous Effects of DC/DC Converters 1 and 2 According to the First Embodiment]

According to the DC/DC converters 1 and 2 according to the first embodiment as described above, the upper limit value ILmax of the inductor current can be determined in real time according to the changes in the input dc voltage Vin and the load current Iload. It is therefore possible to always operate the DC/DC converter with the maximum power conversion efficiency. The advantageous effects of the DC/DC converters 1 and 2 will be supplemented below in contradistinction to the DC/DC converter 901 illustrated as the comparative example.

Figure 13:
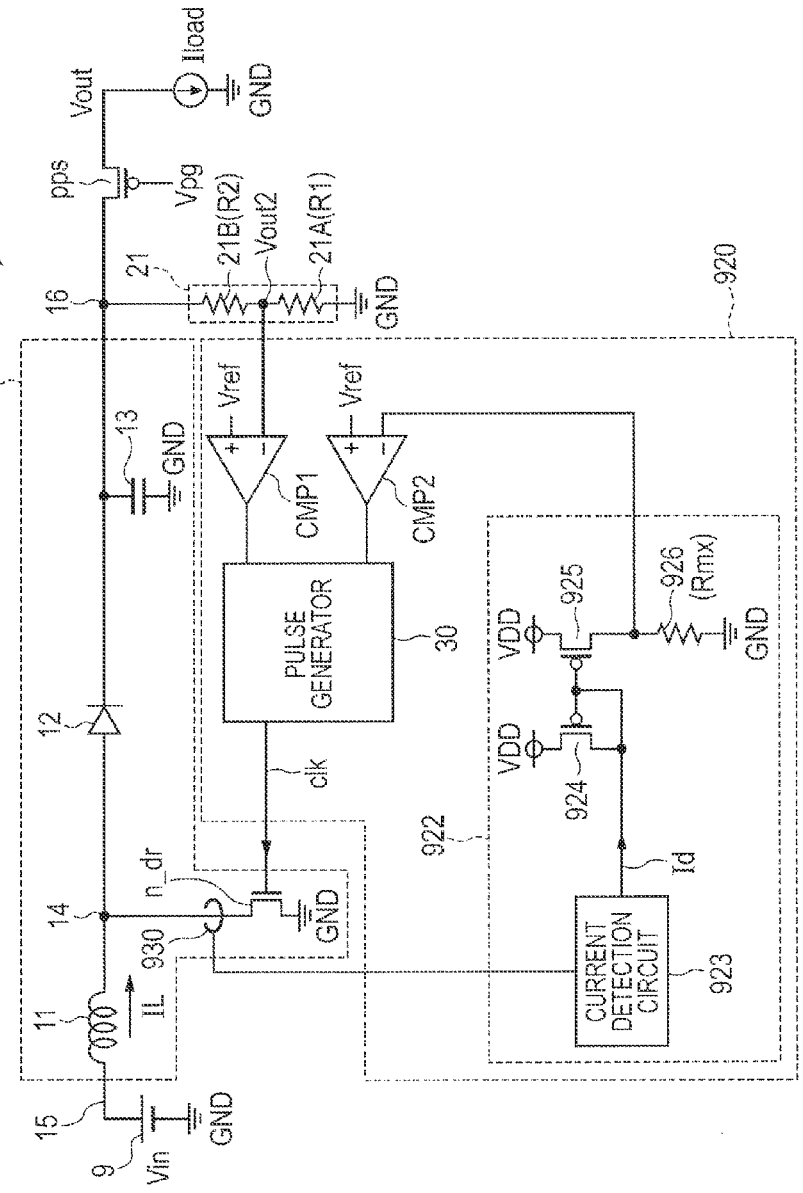
FIG. 13 is a circuit diagram showing a configuration of a DC/DC converter 901 illustrated as a comparative example of the DC/DC converter 1 of FIG. 2.

FIG. 13 is a circuit diagram showing a configuration of the DC/DC converter 901 illustrated as the comparative example of the DC/DC converter 1 shown in FIG. 2. Referring to FIG. 13, the DC/DC converter 901 of the comparative example includes a converter circuit 10, a voltage divider 21, a control circuit 920 and a current sensor 930. The converter circuit 10 and the voltage divider 21 are identical in configuration to those in the DC/DC converter 1 shown in FIG. 2.

The control circuit 920 takes a circuit configuration in which a Ton/Toff ratio is automatically set from an input voltage Vin under feed forward control. However, the Ton/Toff ratio is fixed therein. Described specifically, the Ton/Toff ratio is set to the maximum value in such a manner that the input dc voltage Vin is capable of being boosted on the lowest condition. For example, the maximum condition of the Ton/Toff ratio becomes $3V/1V-1=2$ when an input range is from 1V to 2V and an output potential is 3V. When the period of the clock signal clk is 1 µs, the on time is set to 0.67 µs, and the off time is set to 0.33 µs.

When the output voltage Vout exceeds an upper limit value Vout* or the inductor current IL exceeds an upper limit value ILmax, the control circuit 920 fixes the clock signal clk to an L level. A concrete circuit configuration thereof is as shown in FIG. 13. The control circuit 920 includes the voltage divider 21, a pulse generator 30, comparators CMP1 and CMP2 and an overcurrent protection circuit 922. The configurations and operations of the voltage divider 21, the pulse generator 30 and the comparator CMP1 are as described in FIGS. 2 and 8.

The overcurrent protection circuit 922 includes a current detection circuit 923, PMOS transistors 924 and 925 and a resistive element 926. The current detection circuit 923 detects a current (inductor current IL) that flows through an NMOS transistor n_dr, using a current sensor 930. An output current Id of the current detection circuit 923 is copied by a current mirror configured by the PMOS transistors 924 and 925 and supplied to the resistive element 926 (whose resistance value is Rmx). The comparator CMP2 compares a reference voltage Vref and a difference in potential (Id·Rmx) developed across the resistive element 926 provided in the overcurrent protection circuit 922. The comparator CMP2 outputs a signal brought to an L level when the voltage of the resistive element 926 exceeds the reference voltage Vref to thereby bring the NMOS transistor n_dr to an off state.

Figure 14:
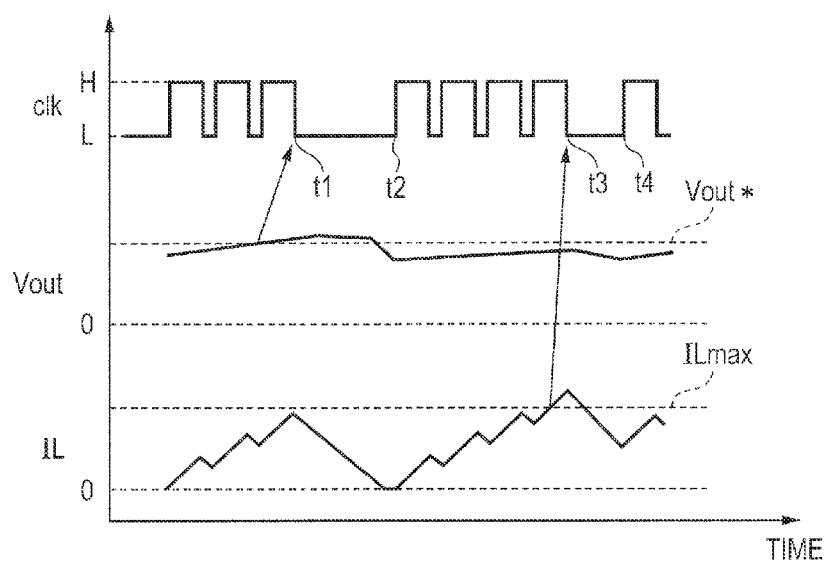
FIG. 14 is a waveform diagram of respective parts of the DC/DC converter 901 shown in FIG. 13.

FIG. 14 is a waveform diagram of the respective parts of the DC/DC converter 901 of FIG. 13. The graph of FIG. 14 shows the clock signal clk, the output voltage Vout of the DC/DC converter and the inductor current IL in order from above.

Referring to FIG. 14, when the output voltage Vout reaches a desired target voltage Vout*, the clock signal clk stops by the output of the comparator CMP1 in FIG. 1. Therefore, the operation of stepping up of the DC/DC converter is stopped (time t1 in FIG. 14). Since it is necessary to set the Ton/Toff ratio to the maximum value where the Ton/Toff ratio is fixed, the period (from the times t1 to t2 in FIG. 14) during which the clock signal clk stops becomes long.

On the other hand, since the Ton/Toff ratio is set according to the ratio between the load current Iload and the input voltage Vin in the case of the DC/DC converters 1 and 2 according to the first embodiment, the stop period of the clock signal clk may be short.

This is similar where the inductor current IL exceeds the upper limit value ILmax. In this case, the clock signal clk is stopped by the output of the comparator CMP2 in FIG. 1 to prevent the switching element from breaking down (time t3 in FIG. 14). Since the Ton period is set long where the Ton/Toff ratio is fixed, a larger current than necessary flows through the inductor 11. As a result, the stop period (from the times t3 to t4) of the clock signal clk in the case of the comparative example becomes longer than in the case of the DC/DC converters 1 and 2 according to the first embodiment.

[Modification]

Figure 15:
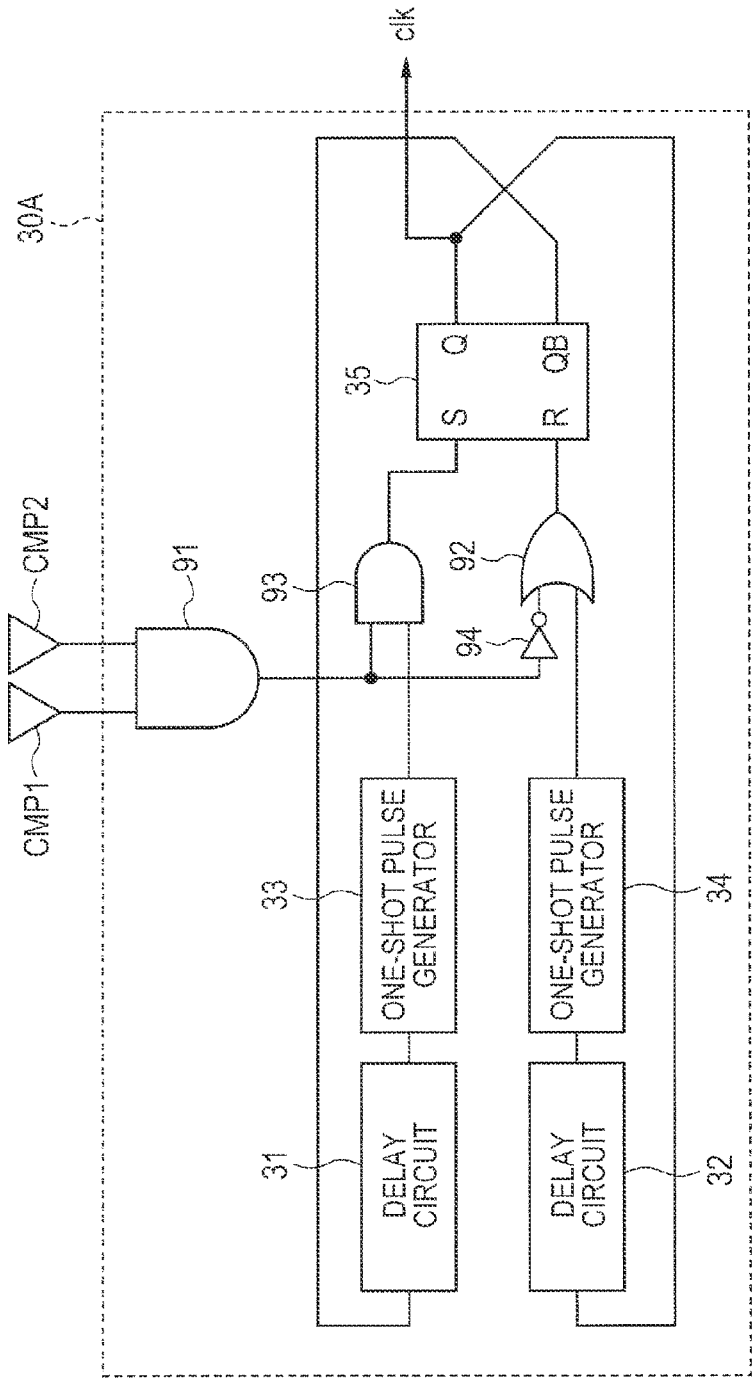
FIG. 15 is a circuit diagram showing a configuration of a pulse generator 30A illustrated as a modification of the pulse generator 30 shown in FIG. 8.

FIG. 15 is a circuit diagram showing a configuration of a pulse generator 30A illustrated as a modification of the pulse generator 30 of FIG. 8.

Referring to FIG. 15, the pulse generator 30A includes delay circuits 31 and 32, one-shot pulse generators 33 and 34, an RS latch circuit 35, an OR gate 92, AND gates 91 and 93, and an inverter 94.

In FIG. 15, the AND gate 91 performs the ANDing operation on an output signal of a comparator CMP1 and an output signal of a comparator CMP2 and outputs the result of ANDing operation therefrom.

A signal outputted from an inversion output terminal QB of the RS latch circuit 35 is delayed by the delay circuit 31, followed by being inputted to the one-shot pulse generator 33. When the input signal is switched from an L level to an H level, a pulse is generated from the one-shot pulse generator 33 and inputted to a first input terminal of the AND gate 93. An output signal of the AND gate 91 is inputted to a second input terminal of the AND gate 93. An output signal of the AND gate 93 is inputted to a set terminal S of the RS latch circuit 35.

A signal outputted from a non-inversion output terminal Q of the RS latch circuit 35 is inputted to a gate of an NMOS transistor n_dr as a clock signal clk and delayed by the delay circuit 32, followed by being inputted to the one-shot pulse generator 34. When the input signal is switched from an L level to an H level, a pulse is generated from the one-shot pulse generator 34 and inputted to a first input terminal of the OR gate 92. A signal obtained by inverting the logic level of the output signal of the AND gate 91 by the inverter 94 is inputted to a second input terminal of the OR gate 92. An output signal of the OR gate 92 is inputted to a reset terminal R of the RS latch circuit 35.

According to the above configuration, when the output signals of the comparators CMP1 and CMP2 are both H in level, a clock signal clk having a predetermined period determined by the delay times of the delay circuits 31 and 32 is outputted from the non-inversion output terminal Q of the RS latch circuit 35. When the output signals of the comparators CMP1 and CMP2 are respectively brought to an L level, the RS latch circuit 35 is placed in a reset state so that the clock signal clk is fixed to an L level. As a result, the NMOS transistor n_dr is brought to an off state.

Figure 16A:
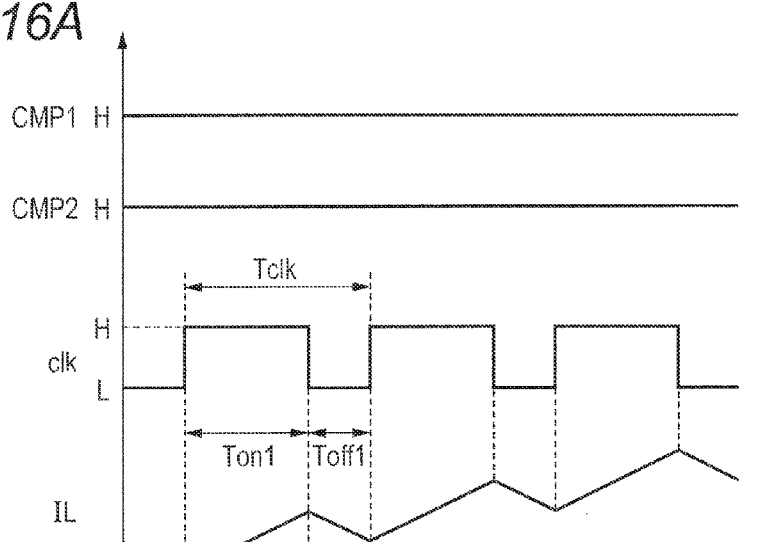
FIGS. 16A and 16B are timing diagrams for describing the operation of the DC/DC converter 1 equipped with the pulse generator 30A having the configuration shown in FIG. 15.
Figure 16B:
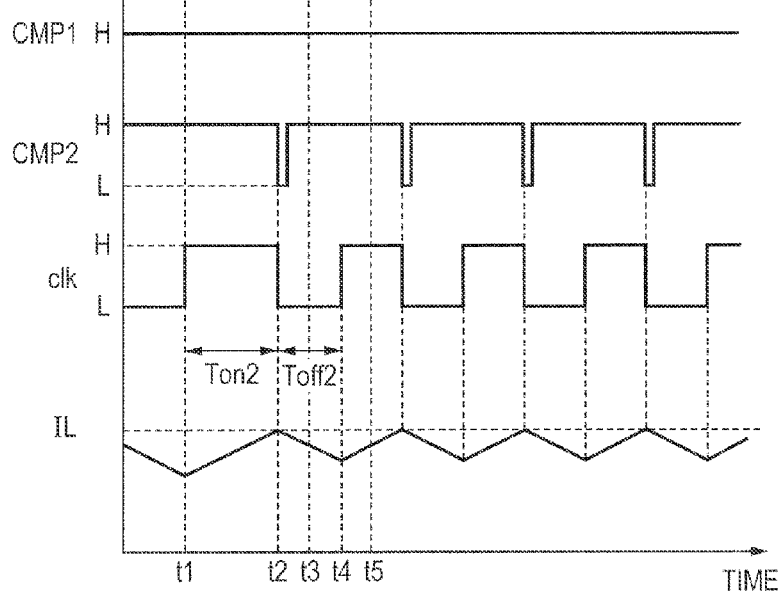

FIGS. 16A and 16B are timing diagrams for describing the operation of the DC/DC converter 1 equipped with the pulse generator 30A having the configuration shown in FIG. 15. Waveforms shown in FIGS. 16A and 16B respectively show the output signals of the comparators CMP1 and CMP2, the clock signal clk and the inductor current IL in FIG. 2 in order from above. FIG. 16A shows a case in which the output signals of the comparators CMP1 and CMP2 of FIG. 2 are respectively of an H level. FIG. 16B shows a case in which the output signal of the comparator CMP2 is temporarily brought to an L level because Iload/Vin has reached an upper limit value.

Since the waveforms of the respective signals in FIG. 16A are similar to the case of FIG. 9A, their description will not be repeated. An on time Ton1 from a time t1 to a time t3 is equivalent to the delay time of the delay circuit 32 of FIG. 15. An off time Toff1 from a time t3 to a time t5 is equivalent to the delay time of the delay circuit 31 of FIG. 15. The sum of the on time Ton1 and the off time Toff1 assumes the period Tclk of the clock signal clk.

Next, referring to FIG. 16B, the clock signal clk is switched to an H level at the time t1 as with the case of FIG. 16A, so that the NMOS transistor n_dr is changed to an on state. As a result, the inductor current IL gradually increases after the time t1.

At the next time t2, prior to the time t3 at which the delay time of the delay circuit 32 of FIG. 15 elapses, the output signal of the comparator CMP2 is switched to the L level due to Iload/Vin exceeding the upper limit value. Thus, since the output of the OR gate 92 is switched to an H level, the RS latch circuit 35 is brought to the reset state. As a result, the clock signal clk is switched to the L level and hence the NMOS transistor n_dr is brought to the off state. The inductor current IL gradually decreases after the time t2.

At the next time t4, the delay time of the delay circuit 31 of FIG. 15 elapses. Since the output of the comparator CMP2 has already been returned to the H level, the RS latch circuit 35 is brought to the set state. As a result, the output signal clk of the RS latch circuit 35 is switched to the H level.

When a comparison is made between FIGS. 16A and 16B, the on time Ton2 (between the times t1 and t2) in the case of FIG. 16B is shorter than the on time Ton1 (between the times t1 and t3) in the case of FIG. 16A. On the other hand, the Toff2 (between the times t2 and t4) in the case of FIG. 16B is equal to the off time Toff1 (between the times t3 and t5) in the case of FIG. 16A. Regarding the period of the clock signal clk, the period (Ton2+Toff2) of the clock signal clk in the case of FIG. 16B is shorter than the period Tclk of the clock signal clk in the case of FIG. 16A. Thus, in the DC/DC converter 1 equipped with the pulse generator 30A of FIG. 15, PFM (Pulse Frequency Modulation) control of a feed forward system is realized in which the on time changes according to the magnitude of Iload/Vin.

Incidentally, contrary to the cases of FIGS. 15, 16A and 16B, the inductor current IL may be controlled so as not to exceed the upper limit value ILmax by changing the off time according to the magnitude of Iload/Vin.

Second Embodiment

Figure 17:
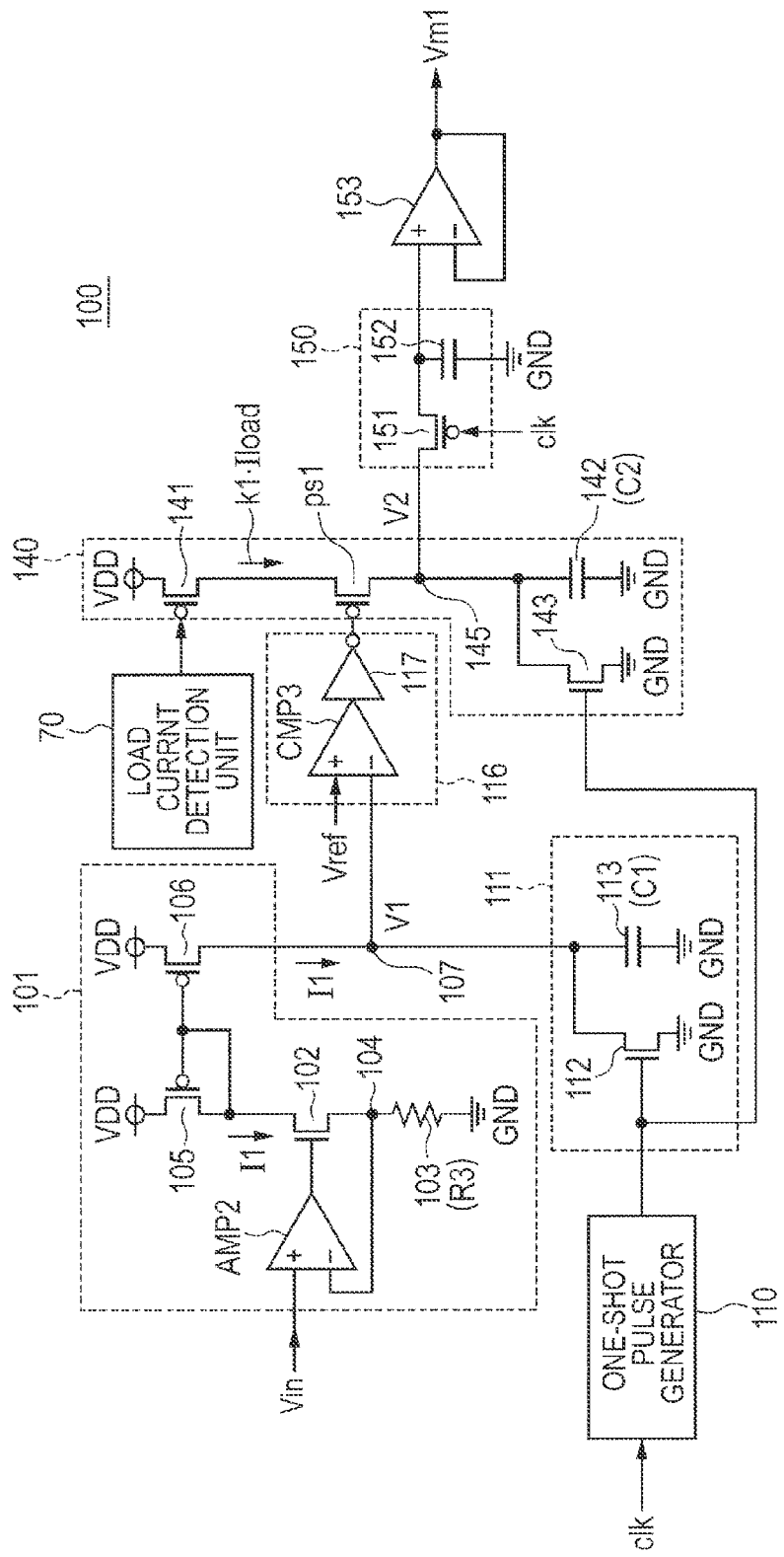
FIG. 17 is a circuit diagram depicting a configuration of a monitor voltage generating unit 100 applied to a DC/DC converter according to a second embodiment of the present invention.
Figure 19:
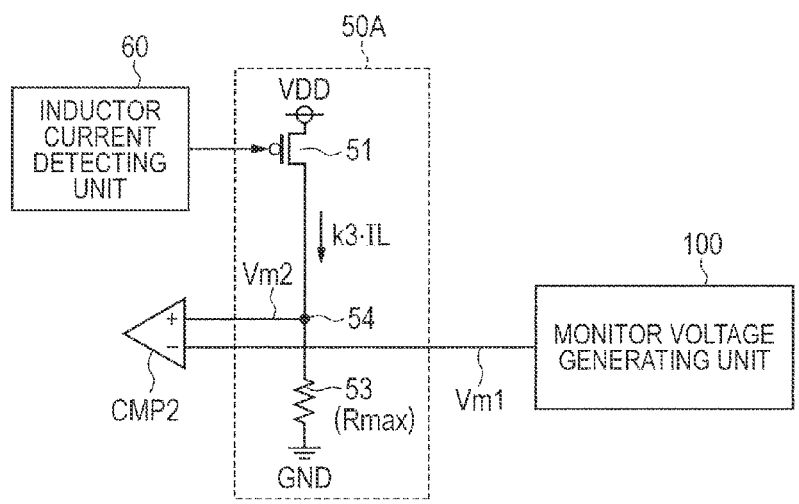
FIG. 19 is a circuit diagram illustrating a configuration of a monitor voltage generating unit 50A applied to the DC/DC converter according to the second embodiment of the present invention.

In the second embodiment, there is shown a second circuit example which determines an upper limit value ILmax of an inductor current in proportion to the ratio (Iload/Vin) between a load current Iload and an input dc voltage Vin. In a DC/DC converter according to the second embodiment, a monitor voltage generating unit 100 shown in FIG. 17 is provided instead of the first monitor voltage generating unit 40 shown in FIGS. 2 and 3. A monitor voltage generating unit 50A shown in FIG. 19 is provided instead of the second monitor voltage generating unit 50 shown in FIGS. 2 and 3. Since the present DC/DC converter is identical in other configuration to the DC/DC converters 1 and 2 shown in FIGS. 2 and 3, their description will not be repeated.

[Configuration of Monitor Voltage Generating Unit 100]

FIG. 17 is a circuit diagram showing a configuration of the monitor voltage generating unit 100 applied to the DC/DC converter according to the second embodiment of the present invention. Referring to FIG. 17, the monitor voltage generating unit 100 includes a voltage/current conversion part 101, a one-shot pulse generator 110, a first charging part 111, a comparison part 116, a second charging part 140, a sample and hold circuit 150, and an operational amplifier 153 used as a voltage follower. The respective components will be explained below in detail.

(Voltage/Current Conversion Part 101)

The voltage/current conversion part 101 generates a conversion current I1 having a current value proportional to an input dc voltage Vin.

Specifically, as shown in FIG. 17, the voltage/current conversion part 101 includes a differential amplifier AMP2, an NMOS transistor 102, a resistive element 103, and PMOS transistors 105 and 106. The PMOS transistor 105, the NMOS transistor 102 and the resistive element 103 are coupled in series between a power supply node VDD and a ground node GND in this order. The input dc voltage Vin is inputted to a non-inversion input terminal of the differential amplifier AMP2. An inversion input terminal of the differential amplifier AMP2 is coupled to a coupling node 104 of the NMOS transistor 102 and the resistive element 103. The PMOS transistor 106 is provided between the power supply node VDD and a node 107. A gate of the PMOS transistor 106 is coupled to a gate and drain of the PMOS transistor 105 so that the PMOS transistors 105 and 106 configure a current mirror.

According to the above configuration, assuming that the resistance value of the resistive element 103 is R3, the conversion current I1 is expressed in I1=Vin/R3 ... (18).

(One-Shot Pulse Generator 110)

When a clock signal clk is switched from an L level to an H level, the one-shot pulse generator 110 generates a one-shot pulse brought to an H level for a predetermined time (e.g., 10 ns). The one-shot pulse generator 110 has the configuration described in FIG. 10, for example.

(First Charging Part 111)

The first charging part 111 is initialized when the clock signal clk is switched from the L level to the H level. After its initialization, the first charging part 111 is charged by the conversion current I1.

Specifically, as shown in FIG. 17, the first charging part 111 includes a capacitor 113 charged by the conversion current I1, and an NMOS transistor 112. The capacitor 113 and the NMOS transistor 112 are coupled in parallel with each other between the node 107 and the ground node GND. The pulse generated from the one-shot pulse generator 110 is inputted to a gate of the NMOS transistor 112. Thus, when the clock signal clk is switched from the L level to the H level, the charging voltage of the capacitor 113 is discharged (initialized).

(Comparison Part 116)

The comparison part 116 compares the charging voltage of the first charging part 111 and a predetermined reference voltage Vref and outputs a signal brought into an active state (L level) during a period of up to the charging voltage of the first charging part 111 exceeding the reference voltage Vref.

Specifically, as shown in FIG. 17, the comparison part 116 includes a comparator CMP3 and an inverter 117 which inverts an output signal of the comparator CMP3 and outputs it therefrom. The comparator CMP3 compares the reference voltage Vref with the charging voltage of the capacitor 113. When the charging voltage of the capacitor 113 falls below the reference voltage Vref, the comparator CMP3 outputs a signal of an H level. When the charging voltage thereof exceeds the reference voltage Vref, the comparator CMP3 outputs a signal of an L level.

Incidentally, the reference voltage Vref inputted to the comparator CMP3 is set identical to the reference voltage Vref inputted to the comparator CMP1 of FIG. 2 for the sake of simplicity, but they may be set different from each other. At least one of the resistance value R3 of the resistive element 103 and the capacitance C1 of the capacitor 113 is adjusted according to the magnitude of the reference voltage Vref inputted to the comparator CMP3.

(Second Charging Part 140)

The second charging part 140 is initialized when the clock signal clk is switched from the L level to the H level. After its initialization, the second charging part 140 is charged by a current k1·Iload having a magnitude proportional to the load current Iload during a period in which the output signal of the comparator 116 is in the active state (L level), i.e., during a period of up to the charging voltage of the first charging part 111 exceeding the reference voltage Vref.

Specifically, as shown in FIG. 17, the second charging part 140 includes a capacitor 142, an NMOS transistor 143, and PMOS transistors ps1 and 141. The PMOS transistor 141, the PMOS transistor ps1 and the capacitor 142 are coupled in series between the power supply node VDD and the ground node GND in this order.

A gate of the PMOS transistor 141 is coupled to a gate and drain of the PMOS transistor 73 that configures the load current detecting unit 70 described in FIG. 7. Thus, since the PMOS transistors 141 and 73 configure a current mirror, a current k1·Iload (where k1: proportionality constant, e.g., k1=1/1000) proportional to the load current Iload flows through the PMOS transistor 141.

The output signal (i.e., the output signal of the inverter 117) of the comparison part 116 is applied to a gate of the PMOS transistor ps1. Thus, the PMOS transistor ps1 is brought into an on state during a period in which the output signal of the comparison part 116 is L in level, i.e., during a period of up to the charging voltage of the first charging part 111 exceeding the reference voltage Vref.

The NMOS transistor 143 is coupled in parallel with the capacitor 142. A pulse outputted from the one-shot pulse generator 110 is inputted to a gate of the NMOS transistor 143. Since the NMOS transistor 143 is temporarily brought into an on state by the one-shot pulse when the clock signal clk is switched from the L level to the H level, the charging voltage of the capacitor 113 is discharged (initialized). After its initialization, the capacitor 142 is charged by the current k1·Iload proportional to the load current Iload during a period in which the output signal of the comparison part 116 is of the L level.

(Sample and Hold Circuit 150)

The sample and hold circuit 150 holds a charging voltage of the second charging part 140 (i.e., capacitor 142) when the clock signal clk is switched from the H level to the L level, and outputs the held charging voltage as a first monitor voltage Vm1. A voltage follower (operational amplifier 153) is provided between the sample and hold circuit 150 and the non-inversion input terminal of the comparator CMP2 of FIG. 2 for impedance conversion.

Specifically, as shown in FIG. 17, the sample and hold circuit 150 includes a PMOS transistor 151 and a capacitor 152. A first main electrode of the PMOS transistor 151 is coupled to a coupling node 145 of the PMOS transistor ps1 and the capacitor 142. A second main electrode of the PMOS transistor 151 is coupled to a non-inversion input terminal of the operational amplifier 153 used as the voltage follower. The capacitor 152 is coupled between the second main electrode of the PMOS transistor 151 and the ground node GND.

[Operation of Monitor Voltage Generating Unit 100]

Figure 18:
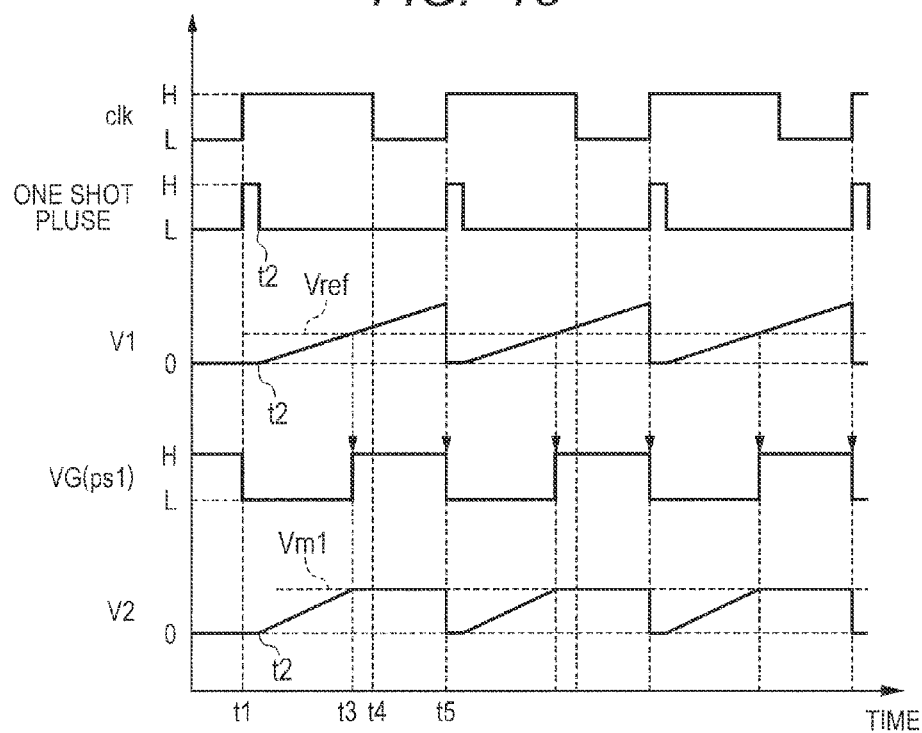
FIG. 18 is a diagram showing voltage waveforms of respective parts of the monitor voltage generating unit 100 shown in FIG. 17.

FIG. 18 is a diagram showing voltage waveforms of the respective parts of the monitor voltage generating unit 100 shown in FIG. 17. The waveform diagram of FIG. 18 shows the clock signal clk, the output signal of the one-shot pulse generator 110, the charging voltage (voltage of the node 107) V1 of the capacitor 113, the gate voltage VG (ps1) of the PMOS transistor ps1, and the charging voltage (voltage of the node 145) V2 of the capacitor 142. The operation of the monitor voltage generating unit 100 will be explained below with reference to FIGS. 17 and 18.

At a time t1, a pulse is generated from the one-shot pulse generator 110 in sync with the rising edge of the clock signal clk. The NMOS transistors 112 and 143 are respectively brought to an on state during a period from times t1 to t2 with the reception of the pulse at their gates, so that the charging voltages of the capacitors 113 and 142 are initialized.

After the time t2, the capacitor 113 is charged by the conversion current I1 (=Vin/R3), and the capacitor 142 is charged by the current k1·Iload proportional to the load current Iload.

At the next time t3, the charging voltage V1 of the capacitor 113 reaches the reference voltage Vref. Thus, since the output of the comparator CMP3 is switched to an L level, the gate voltage VG (ps1) of the PMOS transistor ps1 is changed over to an H level. As a result, the charging of the capacitor 142 is stopped because the PMOS transistor ps1 is brought into an off state. The charging voltage V2 of the capacitor 142 at this time is equivalent to the monitor voltage Vm1.

Assuming that the capacitance of the capacitor 113 is C1, a charging time Δt (from the times t2 to t3) of the capacitor 113 is expressed in $\Delta = \text{Vref} \cdot C1/I1 = \text{Vref} \cdot C1 \cdot R3/\text{Vin}$ ... (19). Assuming that the capacitance of the capacitor 142 is C2, the monitor voltage Vm1 is given by $\text{Vm1} = \Delta t \cdot k1 \cdot \text{Iload}/C2 = (\text{Vref} \cdot k1 \cdot C1 \cdot R3/C2) \cdot (\text{Iload}/\text{Vin}) \propto \text{Iload}/\text{Vin}$ ... (20) because the capacitor 142 is charged by the current k1·Iload during the charging time Δt. That is, the monitor voltage Vm1 is proportional to the ratio (Iload/Vin) between the load current Iload and the input dc current Vin.

At the next time t4, the clock signal clk falls from the H level to the L level. With this timing, the sample and hold circuit 150 holds the charging voltage V2 (i.e., the monitor voltage Vm1) of the capacitor 142. Since the current IL of the inductor 11 is restricted during a period in which the NMOS transistor n_dr is on, the charging voltage V2 of the capacitor 142 is retained in the capacitor 152 as the monitor voltage Vm1 and supplied to the non-inversion input terminal of the comparator CMP2 during the period in which the clock signal clk is at the L level.

[Configuration of Monitor Voltage Generating Unit 50A]

FIG. 19 is a circuit diagram showing the configuration of the monitor voltage generating unit 50A applied to the DC/DC converter according to the second embodiment of the present invention. The monitor voltage generating unit 50A shown in FIG. 19 is different from the monitor voltage generating unit 50 of FIG. 6 in that the constant current source 52 is not included. Thus, a current k3·ILmax proportional to the inductor current IL flows through a resistive element 53. A voltage (difference in potential developed across the resistive element 53) Vm2 of a coupling node 54 is given by $\text{Vm2} = k3 \cdot \text{IL} \cdot \text{Rmax}$ ... (21) and proportional to the inductor current IL. The voltage Vm2 is inputted to its corresponding inversion input terminal of the comparator CMP2 as a monitor voltage Vm2.

Since the monitor voltage Vm1 of the equation (20) and the monitor voltage Vm2 of the equation (21) are compared by the comparator CMP2, the upper limit value ILmax of the inductor current IL can be expressed in $\text{ILmax} \propto \text{Iload}/\text{Vin}$ ... (22).

[Advantageous Effects of DC/DC Converter According to the Second Embodiment]

According to the DC/DC converter according to the second embodiment as described above, the upper limit value ILmax of the inductor current can be determined in real time according to the changes in the input dc voltage Vin and the load current Iload. It is therefore possible to operate the DC/DC converter with the maximum power conversion efficiency at all times.

In particular, the second embodiment does not need the NMOS transistor n1 operated in the linear region (unsaturated region) such as described in FIG. 6 unlike the case of the first embodiment. There is therefore a merit that it is not necessary to set the operation region of the transistor.

Third Embodiment

In the first and second embodiments, the upper limit value ILmax of the inductor current IL is set to the required minimum value capable of supplying the load current Iload. Therefore, at the start of step-up and when the output voltage Vout is temporarily reduced, the large load current Iload cannot be obtained, and it takes time to allow the output voltage Vout to reach the set voltage. A DC/DC converter according to a third embodiment aims to solve the above problems and increases the upper limit value ILmax of an inductor current IL according to a deviation from an expected value of an output value Vout to improve the stability of the output voltage Vout.

Figure 20:
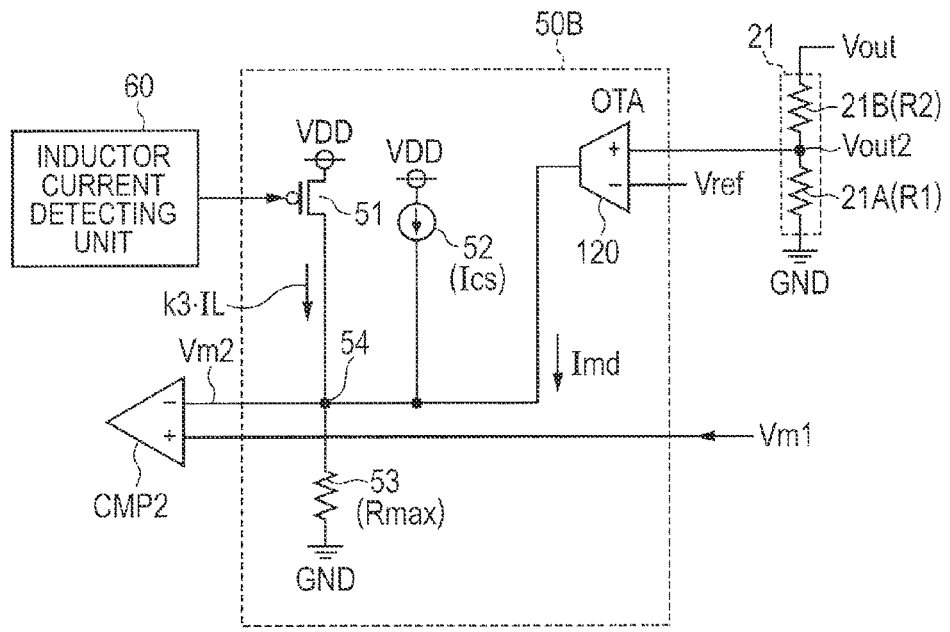
FIG. 20 is a circuit diagram depicting a configuration of a monitor voltage generating unit 50B applied to a DC/DC converter according to a third embodiment of the present invention.

FIG. 20 is a circuit diagram showing a configuration of a monitor voltage generating unit 50B applied to the DC/DC converter according to the third embodiment of the present invention. In the DC/DC converters 1 and 2 shown in FIGS. 2 and 3, the monitor voltage generating unit 50 is replaced with the monitor voltage generating unit 50B of FIG. 20. Configurations other than the monitor voltage generating unit 50B are the same as the case of the first embodiment.

Referring to FIG. 20, the monitor voltage generating unit 50B is different from the monitor voltage generating unit 50A of FIG. 6 described in the first embodiment in that it further includes an operational transconductance amplifier (OTA) 120. A reference voltage Vref is inputted to an inversion input terminal of the OTA 120. The output voltage Vout2 of the voltage divider 21 shown in each of FIGS. 2 and 3 is inputted to a non-inversion input terminal of the OTA 120. The reference voltage Vref is set according to the expected value Vout* of its output voltage Vout. If a division ratio of the voltage divider 21 is α (=R1/(R1+R2)), then the reference voltage Vref is given by α×Vout*. Incidentally, the reference voltage inputted to the OTA 120 is not necessarily required to be identical to the reference voltage inputted to the comparator CMP1.

The OTA 120 supplies a modification current Imd corresponding to the difference in potential between the reference voltage Vref and the output voltage Vout2 of the voltage divider 21 to a resistive element 53 via a coupling node 54. Thus, the current obtained by adding a constant current Ics and the modification current Imd to the current k3·IL proportional to the inductor current IL flows through the resistive element 53. The voltage (difference in potential developed across the resistive element 53) Vm2 of the coupling node 54 is expressed in Vm2=(k3·IL+Ics+Imd)·Rmax . . . (23) and proportional to the so-added current.

Since the modification current Imd becomes negative when Vref>Vout2, i.e., the output voltage Vout is lower than the expected value Vout*, the OTA 120 absorbs a current. As a result, the rate of rise in the output voltage Vout can be made fast because ILmax increases effectively. Since the modification current Imd becomes positive when Vref<Vout2, i.e., the output voltage Vout is higher than the expected value Vout*, the OTA 120 outputs current. As a result, only a current less than the required amount is supplied to the load because ILmax decreases effectively, so that the output voltage Vout drops.

Incidentally, the OTA 120 of FIG. 20 can also be applied to the monitor voltage generating unit 50A used in the DC/DC converter of the second embodiment shown in FIG. 19. As with the case of FIG. 20, the reference voltage Vref is inputted to the inversion input terminal of the OTA 120, and the output voltage Vout2 of the divider circuit 21 shown in each of FIGS. 2 and 3 is inputted to the non-inversion input terminal of the OTA 120. The output terminal of the OTA 120 is coupled to the coupling node 54. Thus, the current obtained by adding the modification current Imd outputted from the OTA 120 to the current k3·IL proportional to the inductor current IL flows through the resistive element 53.

Figure 21:
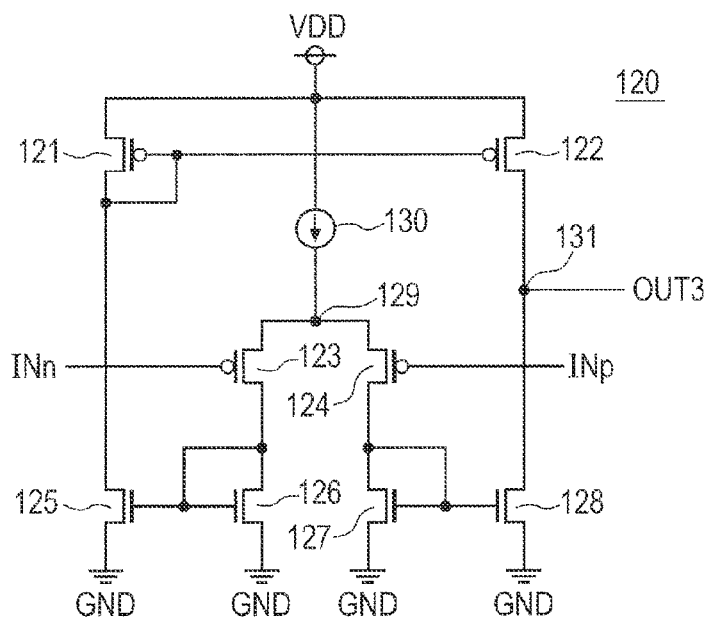
FIG. 21 is a circuit diagram showing one example of a configuration of an OTA 120 shown in FIG. 20.

FIG. 21 is a circuit diagram showing one example of a configuration of the OTA 120 of FIG. 20. Referring to FIG. 21, the OTA 120 includes PMOS transistors 121 through 124, NMOS transistors 125 through 128 and a constant current source 130.

The transistors 121 and 125 are coupled in series between a power supply node VDD and a ground node GND in this order. The transistors 122 and 128 are coupled in series between the power supply node VDD and the ground node GND in this order. The transistors 123 and 126 are coupled in series between a node 129 and the ground node GND in this order. The transistors 124 and 127 are coupled in series between the node 129 and the ground node GND in this order.

The constant current source 130 is coupled between the power supply node VDD and the node 129.

A gate of the PMOS transistor 121 is coupled to its drain and coupled to a gate of the PMOS transistor 122. That is, the PMOS transistors 121 and 122 configure a current mirror. A gate of the NMOS transistor 126 is coupled to its drain and coupled to a gate of the NMOS transistor 125. That is, the NMOS transistors 125 and 126 configure a current mirror. A gate of the NMOS transistor 127 is coupled to its drain and coupled to a gate of the NMOS transistor 128. That is, the NMOS transistors 127 and 128 configure a current mirror.

In the OTA 120 having the above configuration, a gate of the PMOS transistor 124 is used as a non-inversion input terminal INp of the OTA 120. A gate of the PMOS transistor 123 is used as an inversion input terminal INn of the OTA 120. A coupling node 131 of the transistors 122 and 128 is used as an output node OUTS of the OTA 120. Thus, if the voltage of the non-inversion input terminal INp increases more than the voltage of the inversion input terminal INn, then a current flowing through each of the transistors 124, 127 and 128 decreases according to the amount of increase in the voltage of the non-inversion input terminal INp, and hence a current flowing through each of the transistors 123, 126, 125, 121 and 122 increases. As a result, the current that flows outside from the output node OUT3 increases. If the voltage of the non-inversion input terminal INp decreases more than the voltage of the inversion input terminal INn in reverse, then a current flowing through each of the transistors 124, 127 and 128 increases according to the amount of decrease in the voltage of the non-inversion input terminal INp, and hence a current flowing through each of the transistors 123, 126, 125, 121 and 122 decreases. As a result, the current that flows into the output node OUT3 from outside increases.

The embodiments disclosed this time are to be considered in all respects as illustrative and not restrictive. The scope of the present invention is indicated by the appended claims rather than by the foregoing description, and all changes which come within the meaning and range of the claims and equivalency thereof are intended to be embraced therein.

What is claimed is:

1. A DC/DC converter comprising:
a converter circuit which includes an inductor and a switching element coupled to the inductor, the converter circuit changing an inductor current flowing through the inductor according to on/off of the switching element to thereby convert an input dc voltage into an output dc voltage having a magnitude corresponding to each of an on time and an off time of the switching element and supplying the converted output dc voltage to a load;
an inductor current detecting unit which detects the inductor current when the switching element is in an on state;
a load current detecting unit which detects a load current flowing through the load from the converter circuit; and
a control circuit which determines an upper limit value of the inductor current based on the load current and the input dc voltage and changes at least one of the on and off times of the switching element in such a manner that the detected inductor current does not exceed the upper limit value.

2. The DC/DC converter according to claim 1, wherein the control circuit determines the upper limit value of the inductor current based on a ratio between the load current and the input dc voltage.

3. The DC/DC converter according to claim 2,
wherein the switching element includes a control terminal inputted with a control signal and is switched to an on state or an off state according to a logic level of the control signal,
wherein the control circuit includes:
a first monitor voltage generating unit which generates a first monitor voltage corresponding to the upper limit value based on the ratio between the load current and the input dc voltage;
a second monitor voltage generating unit which generates a second monitor voltage based on the inductor current;
a first comparison part which compares the magnitudes of the first monitor voltage and the second monitor voltage; and
a control signal generating unit which generates the control signal and outputs the same to the control terminal of the switching element, and
wherein when the first monitor voltage exceeds the second monitor voltage, the control signal generating unit fixes the logic level of the control signal in such a manner that the switching element is brought to an off state.

4. The DC/DC converter according to claim 3,
wherein the first monitor voltage generating unit includes a MOS transistor through which a current proportional to the load current flows, and a differential amplifier which amplifies a difference between a voltage proportional to the input dc voltage and a voltage applied between a drain and source of the MOS transistor, and
wherein an output of the differential amplifier is inputted to a gate of the MOS transistor and inputted to the first comparison part as the first monitor voltage.

5. The DC/DC converter according to claim 4, wherein the second monitor voltage generating unit generates a current obtained by adding a constant current having a predetermined magnitude to a current having a magnitude proportional to the inductor current and outputs a voltage having a magnitude proportional to the generated current to the first comparison part as the second monitor voltage.

6. The DC/DC converter according to claim 4,
wherein the control circuit further includes an operational transconductance amplifier which generates a modification current having a magnitude proportional to a voltage of a difference between a voltage proportional to the output dc voltage and a predetermined reference voltage, and
wherein the second monitor voltage generating unit generates a current obtained by adding a constant current having a predetermined magnitude and the modification current to the current having the magnitude proportional to the inductor current and outputs a voltage having a magnitude proportional to the generated current to the first comparison part as the second monitor voltage.

7. The DC/DC converter according to claim 3,
wherein the switching element is brought to an on state when the control signal is a first logic level and brought to an off state when the control signal is a second logic level, and
wherein the first monitor voltage generating unit includes:
a voltage/current conversion part which generates a conversion current having a current value proportional to the input dc voltage;
a first charging part which is initialized when the control signal is switched from the second logic level to the first logic level and which is charged by the conversion current after the initialization thereof;

a second comparison part which compares a charging voltage of the first charging part with a predetermined first reference voltage;
a second charging part which is initialized when the control signal is switched from the second logic level to the first logic level and which is charged by a current having a magnitude proportional to the load current after the initialization thereof during a period in which the charging voltage of the first charging part exceeds the first reference voltage; and
a sample and hold circuit which holds a charging voltage of the second charging part when the control signal is switched from the first logic level to the second logic level, and outputs the held charging voltage to the second comparison part as the first monitor voltage.

8. The DC/DC converter according to claim 7, wherein the second monitor voltage generating unit outputs a voltage having a magnitude proportional to the inductor current to the first comparison part as the second monitor voltage.

9. The DC/DC converter according to claim 7,
wherein the control circuit further includes an operational transconductance amplifier which generates a modification current having a magnitude proportional to a voltage of a difference between a voltage proportional to the output dc voltage and a predetermined second reference voltage, and
wherein the second monitor voltage generating unit generates a current obtained by adding the modification current to a current having a magnitude proportional to the inductor current and outputs a voltage having a magnitude proportional to the generated current to the first comparison part as the second monitor voltage.

10. The DC/DC converter according to claim 1, wherein in response to the dc output voltage exceeding a predetermined threshold, the controller causes the switching element to be switched off.

11. The DC/DC converter according to claim 1, wherein in response to the inductor current exceeding the upper limit value, the controller causes the switching element to be switched off.

12. The DC/DC converter according to claim 1, wherein in response to the switching element being switched off, a magnitude of the inductor current decreases.

13. The DC/DC converter according to claim 12, wherein in response to the switching element being switched on, the magnitude of the inductor current increases.

14. The DC/DC converter according to claim 1, wherein in response to the switching element being switched on, a magnitude of the inductor current increases
the control circuit determines the upper limit value of the inductor current based on a ratio between the load current and the input dc voltage.

15. The DC/DC converter according to claim 1, wherein the current control circuit receives a detected value of the load current from the load current detecting unit, and a detected value of the inductor current from the inductor current detecting unit.

16. A DC/DC converter comprising:
a converter circuit which includes an inductor and a switching element coupled to the inductor, the converter circuit changing an inductor current flowing through the inductor according to on/off of the switching element to thereby convert an input dc voltage into an output dc voltage having a magnitude corresponding to each of an on time and an off time of the switching element and supplying the converted output dc voltage to a load;

an inductor current detecting unit which detects the inductor current when the switching element is in an on state;

a load current detecting unit which detects a load current flowing through the load from the converter circuit; and a control circuit which determines an upper limit value of the inductor current based on the load current and the input dc voltage and changes at least one of the on and off times of the switching element in such a manner that the detected inductor current does not exceed the upper limit value, wherein the control circuit determines the upper limit value of the inductor current based on a ratio between the load current and the input dc voltage, wherein the switching element includes a control terminal inputted with a control signal and is switched to an on state or an off state according to a logic level of the control signal, wherein the control circuit includes:
- a first monitor voltage generating unit which generates a first monitor voltage corresponding to the upper limit value based on the ratio between the load current and the input dc voltage;
- a second monitor voltage generating unit which generates a second monitor voltage based on the inductor current;
- a first comparison part which compares the magnitudes of the first monitor voltage and the second monitor voltage; and
- a control signal generating unit which generates the control signal and outputs the same to the control terminal of the switching element, and wherein when the first monitor voltage exceeds the second monitor voltage, the control signal generating unit fixes the logic level of the control signal in such a manner that the switching element is brought to an off state.

* * * * *